US008617506B2

(12) United States Patent
Shima et al.

(10) Patent No.: US 8,617,506 B2
(45) Date of Patent: Dec. 31, 2013

(54) METHOD AND FACILITY FOR RECOVERING $CO_2$ GAS IN CEMENT MANUFACTURING FACILITY

(75) Inventors: Hirokazu Shima, Ibaraki (JP); Eiichi Motohashi, Ibaraki (JP); Junzhu Wang, Ibaraki (JP); Yoshinori Takayama, Ibaraki (JP)

(73) Assignee: Mitsubishi Materials Corporation, Tokyo (JP)

( * ) Notice: Subject to any disclaimer, the term of this patent is extended or adjusted under 35 U.S.C. 154(b) by 297 days.

(21) Appl. No.: 12/990,659

(22) PCT Filed: Apr. 30, 2009

(86) PCT No.: PCT/JP2009/001945
§ 371 (c)(1),
(2), (4) Date: Nov. 2, 2010

(87) PCT Pub. No.: WO2009/136485
PCT Pub. Date: Nov. 12, 2009

(65) Prior Publication Data
US 2011/0044880 A1    Feb. 24, 2011

(30) Foreign Application Priority Data

May 7, 2008    (JP) .................... 2008-121386
May 7, 2008    (JP) .................... 2008-121387
May 7, 2008    (JP) .................... 2008-121388

(51) Int. Cl.
*C01B 31/20*    (2006.01)
(52) U.S. Cl.
USPC .............. 423/437.1; 106/713; 106/696
(58) Field of Classification Search
USPC .............. 423/437.1; 106/709, 713, 739, 606, 106/693, 703
See application file for complete search history.

(56) References Cited

U.S. PATENT DOCUMENTS 6,908,507 B2 *    6/2005    Lalande et al. ............ 106/739
2004/0129181 A1    7/2004    Lalande et al.

FOREIGN PATENT DOCUMENTS

| JP | 9 110485 | 4/1997 |
|---|---|---|
| JP | 2004 231424 | 8/2004 |
| WO | 02 083591 | 10/2002 |

OTHER PUBLICATIONS

Fluidized Bed Combustion Systems Integrating CO2 Capture with CaO J. Carlos Abanades, Edward J. Anthony, Jinsheng Wang, and, and John E. Oakey Environmental Science & Technology 2005 39 (8), 2861-2866.*

(Continued)

*Primary Examiner* — Stanley Silverman
*Assistant Examiner* — Richard M Rump
(74) *Attorney, Agent, or Firm* — Oblon, Spivak, McClelland, Maier & Neustadt, L.L.P.

(57) ABSTRACT

To provide a method and facility for enabling $CO_2$ gas generated in a cement manufacturing facility to be separated and recovered at a high concentration. To this end, according to the present invention, the calcination of a cement material and the recovery of $CO_2$ gas generated in a calciner are performed by one of the following steps of: [1] superheating the cement material before calcination to at least the calcination temperature thereof in a superheating furnace and then mixing the superheated cement material with a new cement material before calcination in a mixer/calciner; [2] mixing, in the mixer/calciner, the cement material before calcination with a part of high-temperature cement clinker discharged from a cement kiln; and [3] using an externally heated calciner.

9 Claims, 12 Drawing Sheets

(56) References Cited

OTHER PUBLICATIONS

Process for Capturing CO2 Arising from the Calcination of the CaCO3 Used in Cement Manufacture N. Rodriguez, M. Alonso, G. Grasa, and J. Carlos Abanades Environmental Science & Technology 2008 42 (18), 6980-6984.*

Understanding Cement. "Clinker: the Bogue Calculation". <http://www.understanding-cement.com/bogue.html> Available onlinle Jun. 30, 2007. Accessed Jun. 3, 2013.*

International Search Report issued Jul. 21, 2009 in PCT/JP09/01945 filed Apr. 30, 2009.

U.S. Appl. No. 13/389,739, filed Feb. 9, 2012, Shima, et al.

* cited by examiner

METHOD AND FACILITY FOR RECOVERING CO₂ GAS IN CEMENT MANUFACTURING FACILITY

This application is a National Stage of PCT/JP09/001,945 filed Apr. 30, 2009 and claims the benefit of JP 2008-121386 filed May 7, 2008; JP 2008-121387 filed May 7, 2008; and JP 2008-121388 filed May 7, 2008.

TECHNICAL FIELD

The present invention relates to a method and facility for recovering, in high-concentration, $CO_2$ gas mainly generated at the time of calcination of a cement material in a cement manufacturing facility.

BACKGROUND ART

In recent years, attempts for reducing carbon dioxide ($CO_2$) gas, which is a main cause of the global warming phenomenon, have been made worldwide and in all industries.

The cement industry, together with the electric power industry, the steel industry, and the like, is one of the industries which discharge a large amount of $CO_2$ gas. The discharge amount of $CO_2$ gas of the cement industry is about 4% of the total amount of $CO_2$ gas discharged in Japan. For this reason, the reduction in the amount of $CO_2$ gas discharged in the cement industry greatly contributes to the reduction in the total amount of $CO_2$ gas discharged in Japan.

FIG. 12 shows a common cement manufacturing facility in the cement industry. In the figure, reference numeral 1 denotes a rotary kiln (cement kiln) for burning a cement material.

Two sets of preheaters 3 for preheating the cement material are provided in parallel at the kiln inlet part 2 on the left side of the rotary kiln 1 in the figure. Further, a main burner 5 for heating the inside of the rotary kiln 1 is provided in the kiln outlet part on the right side of the rotary kiln 1 in the figure. Note that reference numeral 6 in the figure denotes a clinker cooler for cooling the burned cement clinker.

Here, each of the preheaters 3 is configured by a plurality of stages of cyclones arranged in series in the vertical direction. As the cement material fed to the uppermost cyclone from a feed line 4 is successively dropped to the lower cyclones, the cement material is preheated by the high-temperature exhaust gas fed from the rotary kiln 1 and ascending from the bottom part of the preheater 3. Further, the preheated cement material is extracted from the second cyclone from the bottom part of the preheater 3, so as to be sent to a calciner 7. In the calciner 7, the cement material is heated and calcined by a burner 7a, and then introduced from the lowermost cyclone into the kiln inlet part 2 of the rotary kiln 1 via a transfer pipe 3a.

On the other hand, an exhaust gas pipe 3b for feeding the combustion exhaust gas discharged from the rotary kiln 1 to the lowermost cyclone is provided at the kiln inlet part 2. The exhaust gas sent to the lowermost cyclone is successively sent to the upper stage cyclones so as to preheat the cement material. Finally, the exhaust gas is exhausted from the upper part of the uppermost cyclone by an exhaust fan 9 via an exhaust line 8.

In the cement manufacturing facility having the above described configuration, cement clinker is manufactured in such a manner that limestone ($CaCO_3$) contained as a main raw material in the cement material is first preheated by the preheater 3, then calcined in the calciner 7 and the lowermost cyclone of the preheater 3, and thereafter burned in the rotary kiln 1 in high temperature atmosphere at about 1450° C.

In the calcination process, the chemical reaction as represented by the formula: $CaCO_3 \rightarrow CaO + CO_2 \uparrow$ is caused so as to generate $CO_2$ gas (generation of $CO_2$ gas resulting from the raw material). The concentration of $CO_2$ gas resulting from the raw material is theoretically 100%. Further, fossil fuel is combusted in the main burner 5 in order to maintain the atmosphere in the rotary kiln 1 at a high temperature. As a result, $CO_2$ gas is also generated by the combustion of fossil fuel (generation of $CO_2$ gas resulting from the fuel). Here, much $N_2$ gas in the combustion air is contained in the exhaust gas discharged from the main burner 5. Thus, the concentration of $CO_2$ gas contained in the exhaust gas and resulting from the fuel is as low as about 15%.

As a result, the high-concentration $CO_2$ gas resulting from the raw material and the low-concentration $CO_2$ gas resulting from the fuel mixedly exist in the exhaust gas discharged from the cement kiln. Thus, in spite of the fact that the discharge amount of $CO_2$ is large, there is a problem that the $CO_2$ gas has a concentration of about 30 to 35% and hence is difficult to be recovered.

On the other hand, as the $CO_2$ gas recovery methods which are being developed at present, there are methods based on a fluid recovery system, a membrane separation system, a solid adsorption system, and the like. However, the methods have a problem that the cost for recovering $CO_2$ gas is still very high.

Further, as a method to prevent the global warming due to $CO_2$ discharged from the cement manufacturing facility, a method is also proposed in which $CO_2$ discharged at a low concentration from the discharge source is separately recovered so as to be condensed up to a concentration of about 100%, and is then liquefied so as to be stored in the ground. However, in this method, the cost for separating and recovering $CO_2$ is high, and hence this method is not realized for the same reason as that for the above described methods.

On the other hand, Patent Literature 1 described below proposes an indirect heating type limestone burning furnace including: a burning zone in which, while limestone ($CaCO_3$) filled in a heat transfer pipe made of a refractory material is moved, the limestone is indirectly burned by high temperature gas (1000° C. to 1300° C.) introduced from a combustion furnace, so as to be decomposed to quicklime (CaO) and carbon dioxide gas ($CO_2$ gas); a cooling zone in which the high-temperature quicklime is cooled by circularly using the generated carbon dioxide gas; and a preheating zone in which the limestone is preheated by the high-temperature carbon dioxide gas generated in the burning zone and by the circulated carbon dioxide gas heated to a high temperature by cooling the quicklime.

According to the heating type limestone burning furnace, limestone is indirectly burned without being in direct contact with the high-temperature combustion gas. This enables high purity quicklime to be obtained regardless of the fuel used. Further, the concentration of the $CO_2$ gas in the heat transfer pipe filled with the limestone is about 100%. Thus, the carbon dioxide gas generated at the time of burning the limestone can be recovered at a high concentration.

However, as shown in FIG. 13, the temperature, at which the calcination reaction of limestone occurs, is rapidly increased as the concentration of $CO_2$ gas is increased in the atmosphere of the heat transfer pipe. As a result, when the concentration of $CO_2$ gas becomes close to 100% (equivalent to the partial pressure of 1 atm under the atmospheric pressure (1 atm)), the temperature exceeds 860° C.

For this reason, when after limestone is calcined by the prior art based on the indirect heating type limestone burning furnace, cement clinker is attempted to be manufactured by adding the other cement materials, such as clay containing $SiO_2$, $Al_2O_3$, and $Fe_2O_3$ to the calcined limestone, the heat transfer pipe needs to be indirectly heated by high-temperature gas having a temperature of 1000° C. to 1300° C. This results in a problem that the cost for manufacturing the cement clinker is increased. Further, since the heat transfer pipe is indirectly heated, there is also a problem that, when fossil fuel is burned so as to obtain the high-temperature gas, a large amount of $CO_2$ gas is, on the contrary, generated by the combustion of the fossil fuel.

CITATION LIST

Patent Literature

Patent Literature 1: Japanese Patent Laid-Open No. 2004-231424

SUMMARY OF INVENTION

The present invention has been made in view of the above described circumstances. An object of the present invention is to provide a method and facility for recovering $CO_2$ gas in a cement manufacturing facility, and for effectively using the heat source in the cement manufacturing facility so as to enable the $CO_2$ gas generated in the cement manufacturing facility to be separated and recovered at a high concentration.

(1) First to Fourth Aspects of the Present Invention

To this end, a first aspect of the present invention provides a method for recovering $CO_2$ gas generated in a cement manufacturing facility in which a cement material is preheated by a first preheater and is then fed and burned in a cement kiln having an atmosphere therein maintained at a high temperature, wherein a process, in which the inside of a mixer/calciner is maintained at least the calcination temperature of the cement material by superheating the cement material before calcination extracted from the first preheater to at least the calcination temperature in a superheating furnace, and then allowing the superheated cement material to be fed to the mixer/calciner and to be mixed with a new cement material before calcination that is extracted from the first preheater and fed to the mixer/calciner, and in which the cement material before calcination is calcined in the mixer/calciner and then again returned to the superheating furnace so as to be circulated to the mixer/calciner, is repeated to recover $CO_2$ gas generated in the mixer/calciner, and a part of the calcined cement material is fed to the cement kiln.

Note that the calcination temperature means a temperature to cause the reaction to decompose limestone, that is, $CaCO_3$ (calcium carbonate) to CaO (calcium oxide) and $CO_2$.

Further, when a part of the calcined cement material is fed to the cement kiln, the part of the calcined cement material may be fed from the mixer/calciner, or may be fed from the superheating furnace.

Further, a second aspect of the present invention is featured in that, in the recovery method according to the first aspect, the cement material before calcination extracted from the first preheater and the other cement material before calcination preheated by a second preheater provided independently of the first preheater are fed to the mixer/calciner, and in that $CO_2$ gas generated in the mixer/calciner is recovered after being used as a heat source of the second preheater.

Further, a third aspect of the present invention provides a facility that recovers $CO_2$ gas generated in a cement manufacturing facility including a first preheater for preheating a cement material, and a cement kiln for burning the cement material preheated by the first preheater, and that is featured by including: an extraction line for extracting the cement material before calcination from the first preheater; a mixer/calciner for allowing the cement material extracted from the extraction line to be introduced therein; a superheating furnace for superheating the cement material fed from the mixer/calciner to at least the calcination temperature of the cement material; a circulation line for returning the cement material superheated in the superheating furnace to the mixer/calciner and for sending the cement material in the mixer/calciner to the superheating furnace; a return line for returning a part of the calcined cement material to the first preheater or the cement kiln; and a $CO_2$ gas exhaust pipe for recovering $CO_2$ gas generated in the mixer/calciner.

Note that when a part of the calcined cement material is returned to the first preheater or the cement kiln, the part of the calcined cement material may be fed from the mixer/calciner, or may be fed from the superheating furnace.

Further, a fourth aspect of the present invention is featured in that the recovery facility according to the third aspect further includes: a second preheater provided independently of the first preheater and for preheating the other cement material; and a transfer pipe for feeding the other cement material before calcination preheated by the second preheater to the mixer/calciner, and in that the $CO_2$ gas exhaust pipe extended from the mixer/calciner is introduced into the second preheater as a heat source of the second preheater.

In the recovery method according to the first or second aspects of the present invention, and in the recovery facility according to the third or fourth aspects of the present invention, the cement material before calcination extracted from the first preheater is superheated to at least the calcination temperature in the superheating furnace and then fed to the mixer/calciner. In the mixer/calciner, the superheated cement material and the newly fed cement material before calcination are mixed with each other so as to be maintained at least the calcination temperature. Thereby, the cement material before calcination is calcined.

As a result, $CO_2$ gas generated by the calcination of the cement material is filled in the mixer/calciner, and the concentration of the $CO_2$ gas becomes about 100%. In this way, according to the recovery method or the recovery facility as described above, it is possible to recover $CO_2$ gas having a concentration of about 100% from the mixer/calciner through the $CO_2$ gas exhaust pipe.

Further, particularly in the second or fourth aspects of the present invention, the high-temperature $CO_2$ gas generated in the mixer/calciner is sent to the second preheater provided independently of the first preheater, so as to be used to preheat the cement material, and thereafter can be recovered as it is from the exhaust gas pipe.

At this time, the inside of the mixer/calciner is held in the atmosphere of $CO_2$ gas having a high concentration of about 100%, and hence the calcination temperature of the cement material is increased. However, clay, silica stone, and a raw material of iron oxide, that is, $SiO_2$, $Al_2O_3$, and $Fe_2O_3$ are contained in the cement material together with limestone ($CaCO_3$).

Thus, in the cement material, the reactions represented by the following formulas are caused by the atmosphere at a temperature of about 800 to 900° C.

$$2CaCO_3 + SiO_2 \rightarrow 2CaO.SiO_2 + 2CO_2\uparrow \qquad (1)$$

$$2CaCO_3 + Fe_2O_3 \rightarrow 2CaO.Fe_2O_3 + 2CO_2\uparrow \qquad (2)$$

$$CaCO_3 + Al_2O_3 \rightarrow CaO.Al_2O_3 + CO_2\uparrow \qquad (3)$$

Thereby, alite ($3CaO.SiO_2$) and belite ($2CaO.SiO_2$) which are calcium silicate compounds to constitute cement clinker, an aluminate phase ($3CaO.Al_2O_3$) and ferrite phase ($4CaO.Al_2O_3.Fe_2O_3$) which are interstitial phases, are eventually produced.

In this case, as can be seen from a graph shown in FIG. 3 and showing the reaction temperature of the formula (1), a graph shown in FIG. 4 and showing the reaction temperature of the formula (2), and a graph shown in FIG. 5 and showing the reaction temperature of the formula (3), the above described reactions can be caused at a lower temperature even in the case where the partial pressure of $CO_2$ gas represented along the vertical axis of the graphs is increased.

Further, in the cement material, the reactions represented by formula (1) to formula (3) are caused, and in addition, the components of $SiO_2$, $Al_2O_3$, $Fe_2O_3$, and the other trace components, which are introduced from the raw materials, such as silica stone and clay, other than limestone, serve as a mineralizer to promote the thermal decomposition of calcium carbonate. Thus, as shown in FIG. 6, the starting temperature and the ending temperature of the thermal decomposition are both lowered as compared with the case of calcium carbonate alone. Note that FIG. 6 shows the results obtained in such a manner that, when a sample of the cement material (raw material), and a sample of limestone ($CaCO_3$) alone were respectively heated at a heating rate of 10 K/sec close to the heating rate in the common cement manufacturing facility, the transition of the above described thermal decomposition was confirmed based on the change in the weight of the samples.

From the above, according to the present invention, even when the operating temperature (superheating temperature) in the superheating furnace is lowered, a desired recovery amount of $CO_2$ gas can be secured, and hence the thermal load, the coating trouble, and the like, in the facility can be reduced.

Further, the cement material before calcination introduced into the mixer/calciner is preheated by the first preheater in the cement manufacturing facility similarly to the common cement manufacturing process. The other cement material in the second or fourth aspect of the present invention is also preheated in the second preheater by the high-temperature $CO_2$ gas discharged from the mixer/calciner.

Further, a part of the calcined high-temperature cement material is used by being circulated between the mixer/calciner and the superheating furnace. Thus, a large heat amount can be secured in the mixer/calciner. Further, $CO_2$ generated at the time of calcination and resulting from the raw material can be selectively recovered in high concentration without new thermal energy being added to the existing cement manufacturing facility.

Further, particularly in the second or fourth aspect of the present invention, the heat generated at the time of generation of $CO_2$ gas is used to preheat the other cement material, and thereby is also effectively used for the thermal decomposition in the mixer/calciner.

(2) Fifth to Thirteenth Aspects of the Present Invention

A fifth aspect of the present invention provides a method that recovers $CO_2$ gas generated in a cement manufacturing facility in which a cement material is preheated by a first preheater and in which cement clinker is then manufactured by feeding and burning the preheated cement material in a cement kiln having an atmosphere therein maintained at a high temperature, and that is featured in that, after the cement material before calcination is calcined in a mixer/calciner, the inside of which is maintained at least the calcination temperature of the cement material by feeding the cement material before calcination extracted from the first preheater to the mixer/calciner and by introducing a part of the high-temperature cement clinker discharged from the cement kiln into the mixer/calciner, at least the cement material is returned to the first preheater or the cement kiln, and $CO_2$ gas generated in the mixer/calciner is recovered.

Further, a sixth aspect of the present invention is featured in that, in the method for recovering $CO_2$ gas generated in the cement manufacturing facility according to fifth aspect, the cement material before calcination extracted from the first preheater and the other cement material preheated to a temperature below the calcination temperature in a second preheater provided independently of the first preheater are fed to the mixer/calciner, and in that $CO_2$ gas generated in the mixer/calciner is recovered after being used as a heat source of the second preheater.

Further, a seventh aspect of the present invention is featured in that, in the method for recovering $CO_2$ gas generated in the cement manufacturing facility according to the fifth aspect, the cement material calcined in the mixer/calciner and the cement clinker are returned to the first preheater or the cement kiln.

Further, an eighth aspect of the present invention is featured in that, in the method for recovering $CO_2$ gas generated in the cement manufacturing facility according to the sixth aspect, the cement material calcined in the mixer/calciner and the cement clinker are returned to the first preheater or the cement kiln.

On the other hand, a ninth aspect of the present invention is featured in that, in the method for recovering $CO_2$ gas generated in the cement manufacturing facility according to the fifth aspect, the cement material calcined in the mixer/calciner and the cement clinker are separated from each other and the separated cement material is returned to the first preheater or the cement kiln.

Further, a tenth aspect of the present invention is featured in that, in the method for recovering $CO_2$ gas generated in the cement manufacturing facility according to the sixth aspect, the cement material calcined in the mixer/calciner and the cement clinker are separated from each other and the separated cement material is returned to the first preheater or the cement kiln.

An eleventh aspect of the present invention provides a facility that recovers $CO_2$ gas generated in a cement manufacturing facility including a first preheater for preheating a cement material, and a cement kiln for manufacturing cement clinker by burning the cement material preheated by the first preheater, and that is featured by including: an extraction line for extracting the cement material before calcination from the first preheater; a mixer/calciner for allowing the cement material extracted from the extraction line and a part of the high-temperature cement clinker extracted from the cement kiln to be introduced therein and for calcining the introduced cement material; a return line for returning the cement material calcined in the mixer/calciner and the cement clinker to the first preheater or the cement kiln; and a $CO_2$ exhaust gas line for recovering $CO_2$ gas generated in the mixer/calciner.

Further, a twelfth aspect of the present invention provides a facility that recovers $CO_2$ gas generated in a cement manufacturing facility including a first preheater for preheating a cement material, and a cement kiln for manufacturing cement clinker by burning the cement material preheated by the first preheater, and that is featured by including: an extraction line for extracting the cement material before calcination from the first preheater; a mixer/calciner for allowing the cement material extracted from the extraction line and a part of the high-temperature cement clinker extracted from the cement kiln to be introduced therein and for calcining the introduced cement material; separation means for separating the cement material calcined in the mixer/calciner and the cement clinker; a return line for returning the cement material separated by the separation means to the first preheater or the cement kiln; and a $CO_2$ exhaust gas line for recovering $CO_2$ gas generated in the mixer/calciner.

A thirteenth aspect of the present invention is featured in that the facility for recovering $CO_2$ gas generated in the cement manufacturing facility according to one of the eleventh aspect or the twelfth aspect, further includes: a second preheater provided independently of the first preheater and for preheating the other cement material; and a transfer pipe for feeding, to the mixer/calciner, the other cement material before calcination preheated by the second preheater, and in that the $CO_2$ exhaust gas line extended from the mixer/calciner is introduced into the second preheater as a heat source of the second preheater.

In the recovery method according to the fifth to tenth aspects of the present invention, and in the recovery facility according to the eleventh to thirteenth aspects of the present invention, the cement material before calcination extracted from the first preheater is fed to the mixer/calciner, and a part of the high-temperature cement clinker discharged from the cement kiln is introduced into the mixer/calciner. Thereby, the temperature in the mixer/calciner is maintained at least the calcination temperature, so as to allow the cement material before calcination to be calcined. Further, in the sixth and thirteen aspects of the present invention, the cement material, the cement clinker, and the other cement material preheated to a temperature below the calcination temperature in the second preheater are mixed in the mixer/calciner, so as to allow the cement material before calcination to be calcined.

As a result, $CO_2$ gas generated by the calcination of the cement material is filled in the mixer/calciner, and the concentration of the $CO_2$ gas becomes about 100%. In this way, according to the recovery method or the recovery facility as described above, $CO_2$ gas having a concentration of about 100% can be recovered from the mixer/calciner.

Further, particularly in the sixth or thirteenth aspect of the present invention, $CO_2$ gas in the mixer/calciner is sent to the second preheater provided independently of the first preheater, and is used to preheat the other cement material. Thereafter, the $CO_2$ gas can be recovered as it is from the exhaust gas pipe. Thus, the $CO_2$ gas discharged from the mixer/calciner can be effectively used.

In this case, the $CO_2$ gas having a high concentration of about 100% is filled in the mixer/calciner, and hence the calcination temperature of the cement material is increased. However, clay, silica stone, and a raw material of iron oxide, that is, $SiO_2$, $Al_2O_3$, and $Fe_2O_3$ are contained in the cement material together with limestone ($CaCO_3$).

Thus, in the cement material, the reactions represented by the following formulas are caused by the atmosphere at a temperature of about 800 to 900° C.

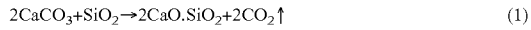
$$2CaCO_3+SiO_2 \rightarrow 2CaO.SiO_2+2CO_2\uparrow \quad (1)$$

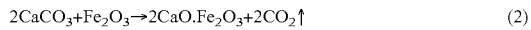
$$2CaCO_3+Fe_2O_3 \rightarrow 2CaO.Fe_2O_3+2CO_2\uparrow \quad (2)$$

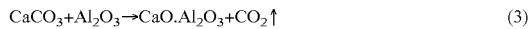
$$CaCO_3+Al_2O_3 \rightarrow CaO.Al_2O_3+CO_2\uparrow \quad (3)$$

Thereby, alite ($3CaO.SiO_2$) and belite ($2CaO.SiO_2$) which are calcium silicate compounds to constitute cement clinker, and an aluminate phase ($3CaO.Al_2O_3$) and a ferrite phase ($4CaO.Al_2O_3.Fe_2O_3$) which are interstitial phases, are eventually produced.

In this case, as can be seen from a graph shown in FIG. 3 and showing the reaction temperature of the formula (1), a graph shown in FIG. 4 and showing the reaction temperature of the formula (2), and a graph shown in FIG. 5 and showing the reaction temperature of the formula (3), the above described reactions can be generated at a lower temperature even in the case where the partial pressure of $CO_2$ gas represented along the vertical axis of the graphs is increased.

Further, in the above described cement material, the reactions represented by formula (1) to formula (3) are caused, and in addition, the components of $SiO_2$, $Al_2O_3$, $Fe_2O_3$, and the other trace components, which are introduced from the raw materials, such as silica stone and clay, other than limestone, serve as a mineralizer to promote the thermal decomposition of calcium carbonate. Thereby, as shown in FIG. 6, the starting temperature and the ending temperature of the thermal decomposition are both lowered as compared with the case of calcium carbonate alone. Note that FIG. 6 shows results obtained in such a manner that, when a sample of the cement material (raw material) and a sample of limestone ($CaCO_3$) alone were respectively heated at a heating rate of 10 K/sec close to the heating rate in the common cement manufacturing facility, the transition of the above described thermal decomposition was confirmed based on the change in the weight of the samples.

From the above, according to the present invention, even when the operating temperature (superheating temperature) in the superheating furnace is lowered, a desired recovery amount of $CO_2$ gas can be secured. Thus, the thermal load, the coating trouble, and the like, can be reduced in the facility.

Further, the cement material before calcination to be introduced into the mixer/calciner is preheated by the first preheater in the cement manufacturing facility similarly to the common cement manufacturing process. Further, the other cement material in the sixth aspect of the present invention is preheated by the second preheater using, as a heating medium, the $CO_2$ gas discharged from the mixer/calciner. Also, the high-temperature cement clinker discharged from the cement kiln is used as a heat source to calcine the cement material before calcination. As a result, additional energy to calcine the cement material is not needed.

Further, in the seventh, eighth, or eleventh aspect of the present invention, a part of the high-temperature cement clinker is circulated between the cement kiln and the mixer/calciner. Thus, a large heat amount can be secured in the mixer/calciner. Further, $CO_2$ generated at the time of calcination and resulting from the raw material can be selectively recovered at a high concentration without the addition of new thermal energy to the existing cement manufacturing facility.

On the other hand, in the ninth, tenth, or twelfth aspect of the present invention, the calcined cement material and the cement clinker discharged from the mixer/calciner are separated from each other, and only the separated cement material is returned to the first preheater or the cement kiln. The separated cement clinker is not sent again to the burning process, and hence extra power, and the like, for driving the cement kiln is not consumed.

(3) Fourteenth to Seventeenth Aspects of the Present Invention

A fourteenth aspect of the present invention provides a method that recovers $CO_2$ gas generated in a cement manufacturing facility in which a cement material is preheated by a preheater and then fed and burned in a cement kiln having an atmosphere therein maintained at a high temperature, and that is featured in that, after the cement material before calcination extracted from the preheater is calcined by being indirectly heated to at least the calcination temperature in an externally heated calciner, the calcined cement material and the $CO_2$ gas generated at the time of calcination are separated from each other so as to allow the cement material to be returned to the preheater or the cement kiln, and the $CO_2$ gas is recovered.

Further, a fifteenth aspect of the present invention is featured in that, in the recovery method of the fourteenth aspect, the cement material before calcination extracted from the preheater, and the other cement material preheated to a temperature below the calcination temperature thereof in a second preheater provided independently of the preheater and having a plurality of stages of cyclones, are indirectly heated to at least the calcination temperature in the externally heated calciner so as to be calcined, and then the calcined cement material and $CO_2$ gas generated at the time of calcination are separated from each other by the cyclone, and the $CO_2$ gas is recovered after being used as a heat source of the second preheater.

A sixteenth aspect of the present invention provides a facility that recovers $CO_2$ gas generated in a cement manufacturing facility including a preheater for preheating a cement material, and a cement kiln for burning the cement material preheated by the preheater, and that is featured by including: a first extraction line for extracting the cement material before calcination from the preheater; an externally heated calciner having the first extraction line introduced therein and for calcining the cement material by indirectly heating the cement material to at least the calcination temperature thereof; solid-gas separation means provided on the outlet side of the externally heated calciner and for separating from each other the calcined cement material and the $CO_2$ gas sent from the first extraction line; a return line for returning the cement material separated by the solid-gas separation means to the preheater or the cement kiln; and a $CO_2$ gas recovery line for recovering the $CO_2$ gas separated by the solid-gas separation means.

Further, a seventeenth aspect according to the present invention is featured in that the facility for recovering $CO_2$ gas generated in the cement manufacturing facility according to the sixteenth aspect further includes: a second preheater provided independently of the preheater and having a plurality of stages of cyclones for preheating the other cement material; a second extraction line for extracting the other cement material preheated by the second preheater; and a circulation line connected between the discharge side of the externally heated calciner and the lower stage cyclone of the second preheater, and branched from the exhaust line of the upper stage cyclone so as to be connected to the inlet side of the externally heated calciner, and in that the solid-gas separation means is the lower stage cyclone of the second preheater, and the first extraction line and the second extraction line are connected to the circulation line on the upstream side of the externally heated calciner.

In the recovery method according to the fourteenth and fifteenth aspects of the present invention, and in the recovery facility according to the sixteenth and seventeenth aspects of the present invention, the cement material before calcination extracted from the first preheater is calcined by being sent to the externally heated calciner and indirectly heated to at least the calcination temperature.

In the fifteenth and seventeenth aspects of the present invention, the cement material preheated by the preheater to a temperature below the calcination temperature, and the other cement material preheated by the second preheater to a temperature below the calcination temperature, are sent to the externally heated calciner from the circulation line so as to be similarly indirectly heated to at least the calcination temperature. Thereby, the cement material before calcination is calcined.

As a result, the first extraction line in the fourteenth and sixteenth aspects of the present invention, or the circulation line in the fifteenth and seventeenth aspects of the present invention, are filled with the calcined cement material and $CO_2$ gas generated by the calcination of the cement material, and the concentration of the $CO_2$ gas becomes about 100%. Further, the calcined cement material and the $CO_2$ gas are separated from each other by the solid-gas separation means. Thereby, the $CO_2$ gas having a concentration of about 100% can be recovered.

Further, particularly in the fifteenth aspect of the present invention, the $CO_2$ gas in the mixer/calciner is sent to the second preheater provided independently of the first preheater, and is used to preheat the cement material. Thereafter, the $CO_2$ gas can be recovered as it is from the recovery line.

In this case, the inside of the first extraction line in the fourteenth and sixteenth aspects of the present invention, or the inside of the circulation line in the fifteenth and seventeenth aspects of the present invention is in the atmosphere of $CO_2$ gas having a high concentration of about 100%, and hence the calcination temperature of the cement material is increased. However, clay, silica stone, and a raw material of iron oxide, that is, $SiO_2$, $Al_2O_3$, and $Fe_2O_3$ are contained in the cement material together with limestone ($CaCO_3$).

Thus, in the cement material, the reactions represented by the following formulas are caused by the atmosphere of a temperature of about 800 to 900° C.

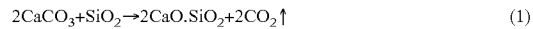
$$2CaCO_3 + SiO_2 \rightarrow 2CaO.SiO_2 + 2CO_2 \uparrow \quad (1)$$

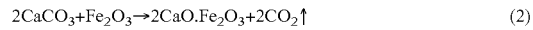
$$2CaCO_3 + Fe_2O_3 \rightarrow 2CaO.Fe_2O_3 + 2CO_2 \uparrow \quad (2)$$

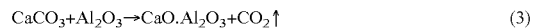
$$CaCO_3 + Al_2O_3 \rightarrow CaO.Al_2O_3 + CO_2 \uparrow \quad (3)$$

Thereby, alite ($3CaO.SiO_2$) and belite ($2CaO.SiO_2$) which are calcium silicate compounds to constitute cement clinker, and an aluminate phase ($3CaO.Al_2O_3$) and a ferrite phase ($4CaO.Al_2O_3.Fe_2O_3$) which are interstitial phases, are eventually produced.

In this case, as can be seen from a graph shown in FIG. 3 and showing the reaction temperature of the formula (1), a graph shown in FIG. 4 and showing the reaction temperature of the formula (2), and a graph shown in FIG. 5 and showing the reaction temperature of the formula (3), the above described reactions can be generated at a lower temperature even in the case where the partial pressure of $CO_2$ gas represented along the vertical axis of the graphs is increased.

Further, in the above described cement material, the reactions represented by formula (1) to formula (3) are caused, and in addition, the components of $SiO_2$, $Al_2O_3$, $Fe_2O_3$, and the other trace components, which are introduced from the raw materials, such as silicic anhydride and clay, other than limestone, serve as a mineralizer to promote the thermal decomposition of calcium carbonate. Thereby, as shown in FIG. 6, the starting temperature and the ending temperature of the thermal decomposition are both lowered as compared with the case of calcium carbonate alone. Note that FIG. 6 shows results obtained in such a manner that, when a sample of the cement material (raw material) and a sample of limestone ($CaCO_3$) alone were respectively heated at a heating rate of 10 K/sec close to the heating rate in the common cement manufacturing facility, the transition of the above described thermal decomposition was confirmed based on the change in the weight of the samples.

From the above, according to the present invention, even when the operating temperature (superheating temperature) in the superheating furnace is lowered, a desired recovery amount of $CO_2$ gas can be secured. Thus, the thermal load, the coating trouble, and the like, can be reduced in the facility.

Further, the cement material before calcination to be indirectly heated in the externally heated calciner is preheated by the first preheater in the cement manufacturing facility similarly to the common cement manufacturing process. Further, the other cement material in the fifteenth aspect of the present invention is preheated by the second preheater using, as the heating medium, the $CO_2$ gas generated at the time of calcination of the cement material. Thus, additional energy for calcining the cement material is not needed.

Further, the heat amount required for the indirect heating in the externally heated calciner is equal to the heat amount originally required for the calcination in the calciner of the cement manufacturing facility. Thus, new thermal energy need not be added to the existing cement manufacturing facility, and $CO_2$ gas generated at the time of calcination and resulting from the raw material can be selectively recovered at a high concentration of about 100%.

DESCRIPTION OF EMBODIMENTS

First Embodiment

Figure 1:
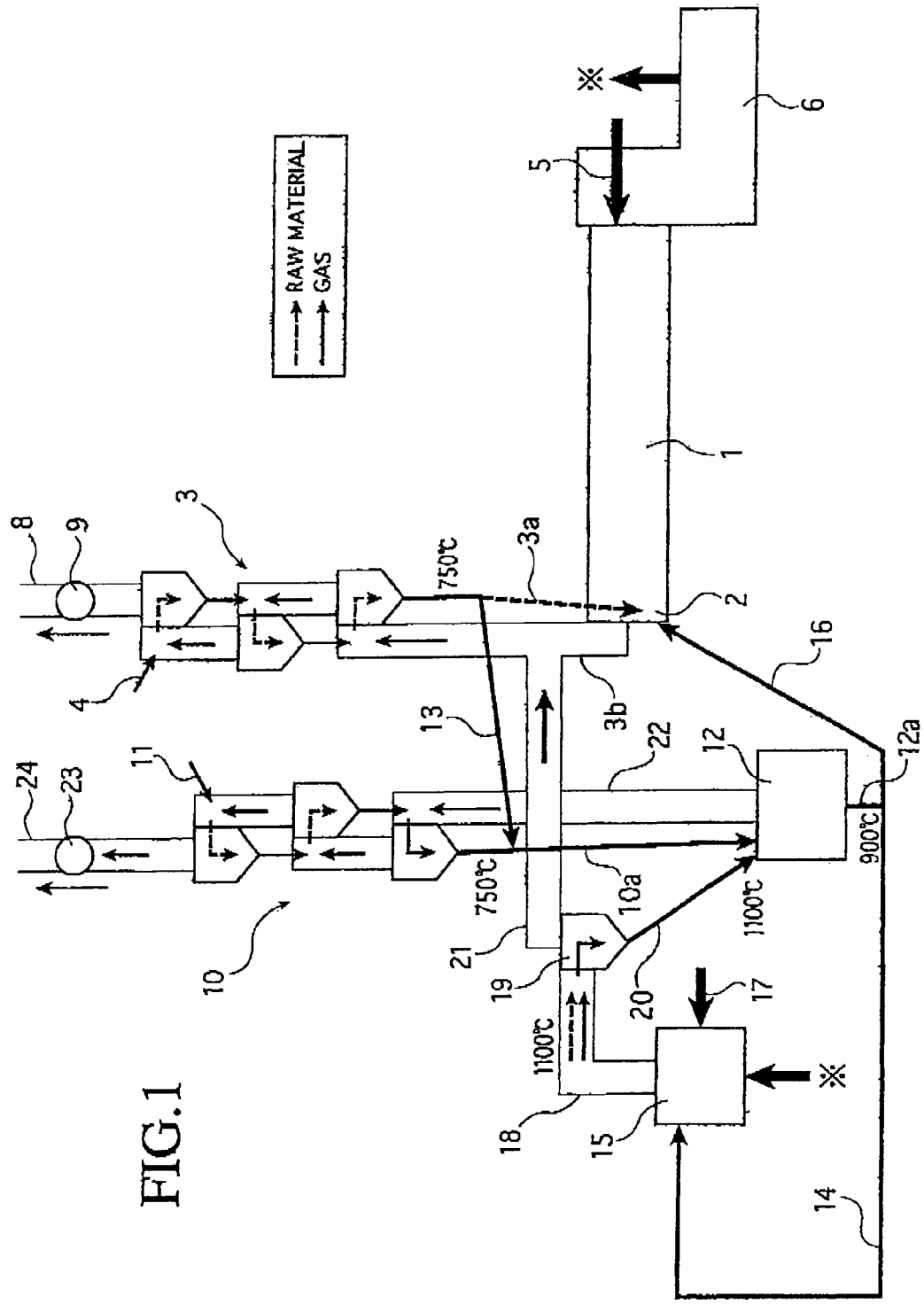
FIG. 1 shows a schematic configuration of a first embodiment of a $CO_2$ gas recovery facility according to the present invention.
Figure 12:
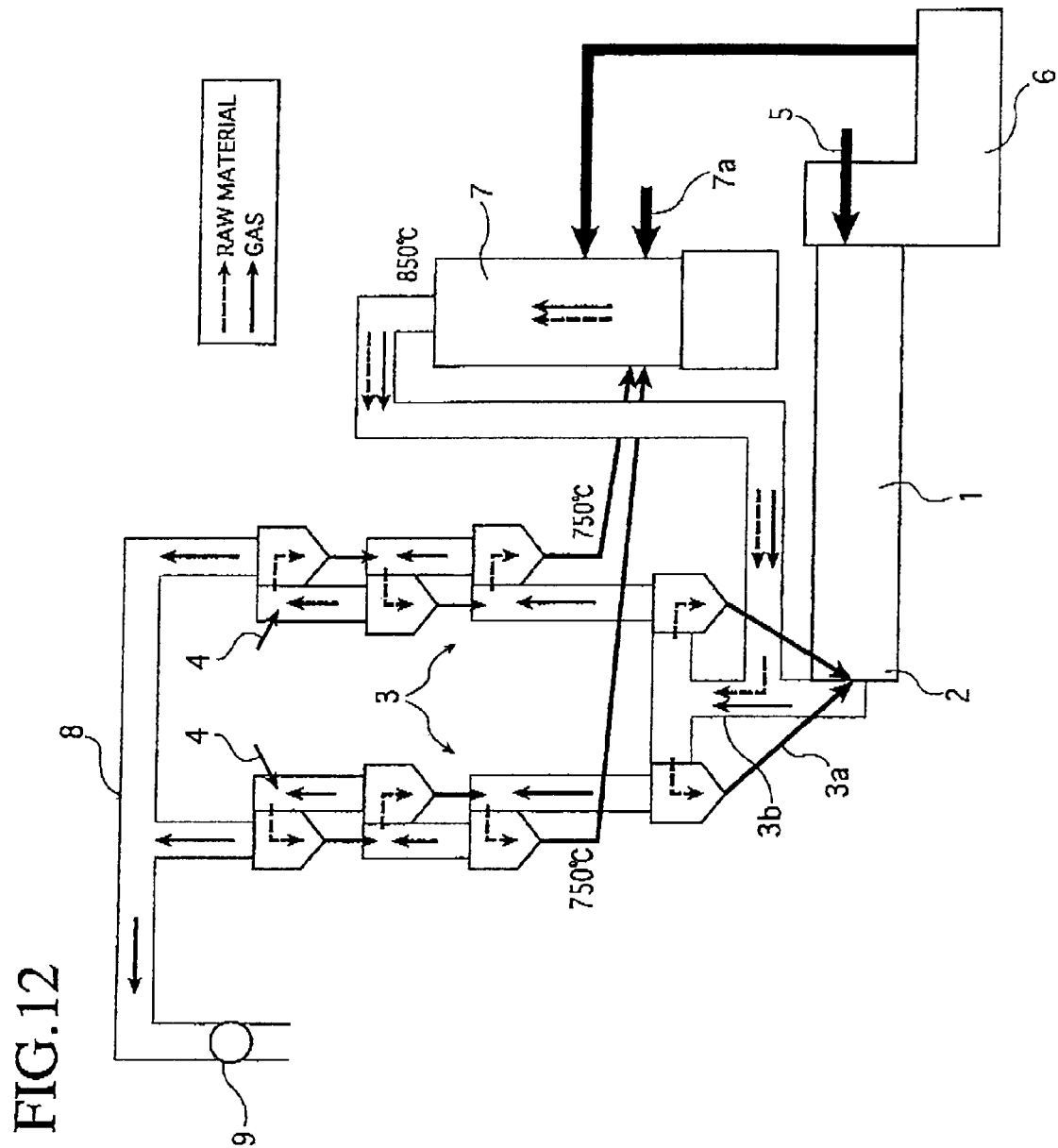
FIG. 12 shows a schematic configuration of a common cement manufacturing facility.
Figure 13:
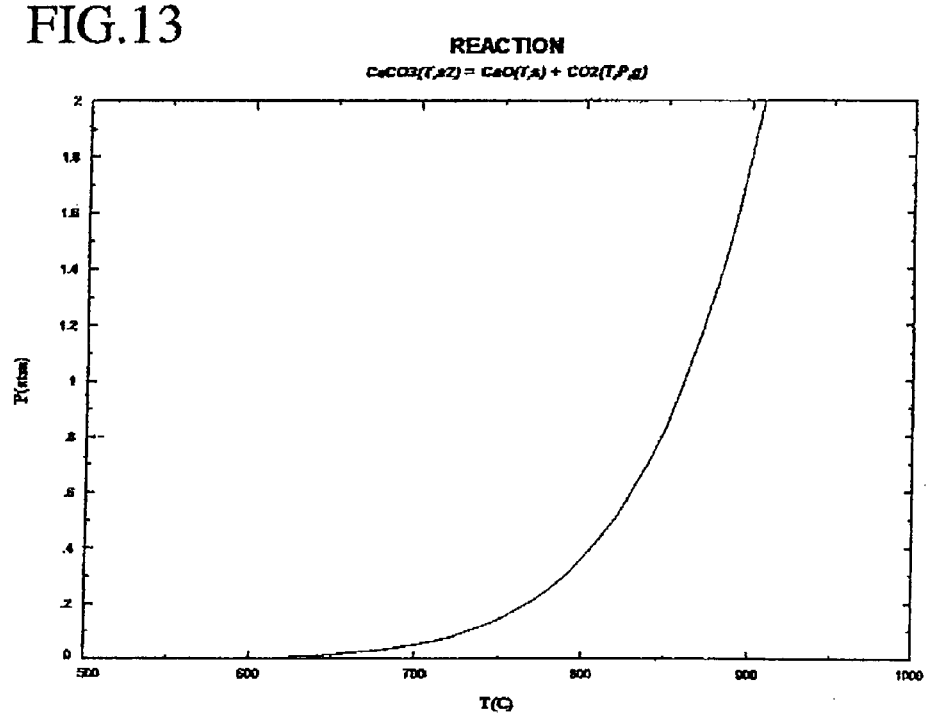
FIG. 13 shows a graph showing a relationship between the concentration of $CO_2$ in the atmosphere and the calcination temperature of limestone.

FIG. 1 shows a first embodiment of a $CO_2$ gas recovery facility in a cement manufacturing facility according to the present invention, in which the configuration of the cement manufacturing facility is the same as that shown in FIG. 12. Thus, in FIG. 1, the same components as those in FIG. 12 are denoted by the same reference numerals and characters, and the explanation thereof is simplified. In FIG. 1, reference numeral 10 denotes a second preheater provided independently of the preheater (first preheater) 3 of the cement manufacturing facility.

The second preheater 10 is configured by a plurality of stages of cyclones arranged in series in the vertical direction similarly to the preheater 3, and is configured such that the cement material is fed to the uppermost cyclone from a feed line 11. Further, the upper end of a transfer pipe 10a is connected to the bottom part of the lowermost cyclone of the second preheater 10. The lower end of the transfer pipe 10a is introduced into a mixer/calciner 12.

On the other hand, an extraction line 13 is provided for extracting the cement material before calcination from the lowermost cyclone of the preheater 3 of the cement manufacturing facility. The distal end of the extraction line 13 is connected to the transfer pipe 10a extended from the second preheater 10. Thereby, the cement material before calcination fed from the second preheater 10 and the cement material before calcination fed from the preheater 3 are introduced into the mixer/calciner 12. Note that the transfer pipe 3a for feeding a part of the cement material to the kiln inlet part 2 of the rotary kiln 1 similarly to the prior art is connected to the intermediate part of the extraction line 13 via a distribution valve for calcination ratio adjustment (not shown).

The mixer/calciner 12 is a powder mixing furnace based on, for example, a fluidized bed system, a rotary kiln system, a packed bed system, or the like. A discharge pipe 12a for extracting the mixed cement material is connected to the bottom part of the mixer/calciner 12. Further, the discharge pipe 12a is branched into two branched pipes. One of the branched pipes is used as a superheating line 14 connected to a superheating furnace 15. The other of the branched pipes is used as a return line 16 connected to the kiln inlet part 2 of the rotary kiln 1. Here, a distribution valve (not shown) is provided at the branching part between the discharge pipe 12a, the superheating line 14, and the return line 16. In the present embodiment, the flow rate in the superheating line 14 is set to be greater than (for example, four times) the flow rate of the return line 16.

The superheating furnace 15 superheats the cement material fed therein to at least the calcination temperature of the cement material by combustion in a burner 17 using, as the combustion air, the air extracted from the clinker cooler 6. An existing calciner can also be modified so as to be used as the superheating furnace 15. Further, on the exhaust side of the superheating furnace 15, a circulation line is provided which is composed of an exhaust pipe 18 for exhausting the exhaust gas generated by the combustion in the burner 17 and for discharging the cement material, a cyclone 19 connected to the exhaust pipe 18 and for separating the cement material from the exhaust gas, and a return pipe 20 for again returning the cement material separated by the cyclone 19 to the mixer/calciner 12.

On the other hand, an exhaust gas pipe 21 for discharging the exhaust gas separated in the cyclone 19 is connected to the exhaust gas pipe 3b extended from the rotary kiln 1. Note that the inside of the superheating furnace 15 needs to be maintained at a high temperature of about 1100° C., while the exhaust gas from the rotary kiln 1 has a temperature of 1100 to 1200° C. Thus, when all or a fixed amount of the exhaust gas from the rotary kiln 1 is introduced into the superheating furnace 15 so as to be again sent to the preheater 3 from the exhaust gas pipe 21, it is possible to effectively use the exhaust gas.

Further, a $CO_2$ exhaust pipe 22 for discharging $CO_2$ gas generated in the mixer/calciner 12 is connected to the mixer/calciner 12, and is introduced into the second preheater 10 as a heating medium of the second preheater 10. Note that in the figure, reference numeral 23 denotes an exhaust fan of $CO_2$ gas, and reference numeral 24 denotes an exhaust line of the $CO_2$ gas.

In the case where a fluidized bed type furnace is used as the mixer/calciner 12, $CO_2$ gas discharged from the mixer/calciner 12 can also be extracted from the $CO_2$ exhaust pipe 22 or the exhaust line 24 so as to be circularly fed again and used in the mixer/calciner 12.

Second Embodiment

Figure 2:
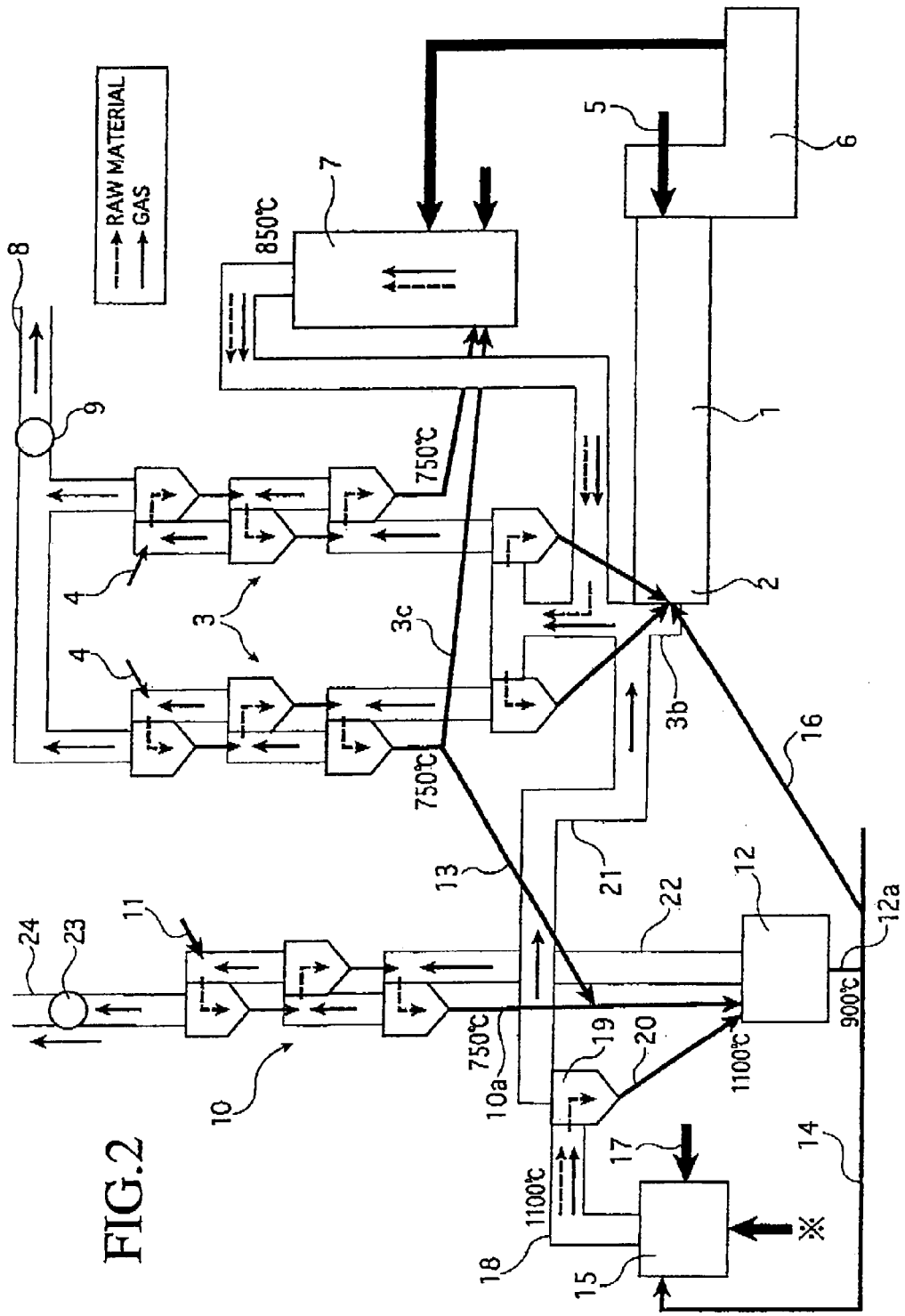
FIG. 2 shows a schematic configuration of a second embodiment of a $CO_2$ gas recovery facility according to the present invention.
Figure 3:
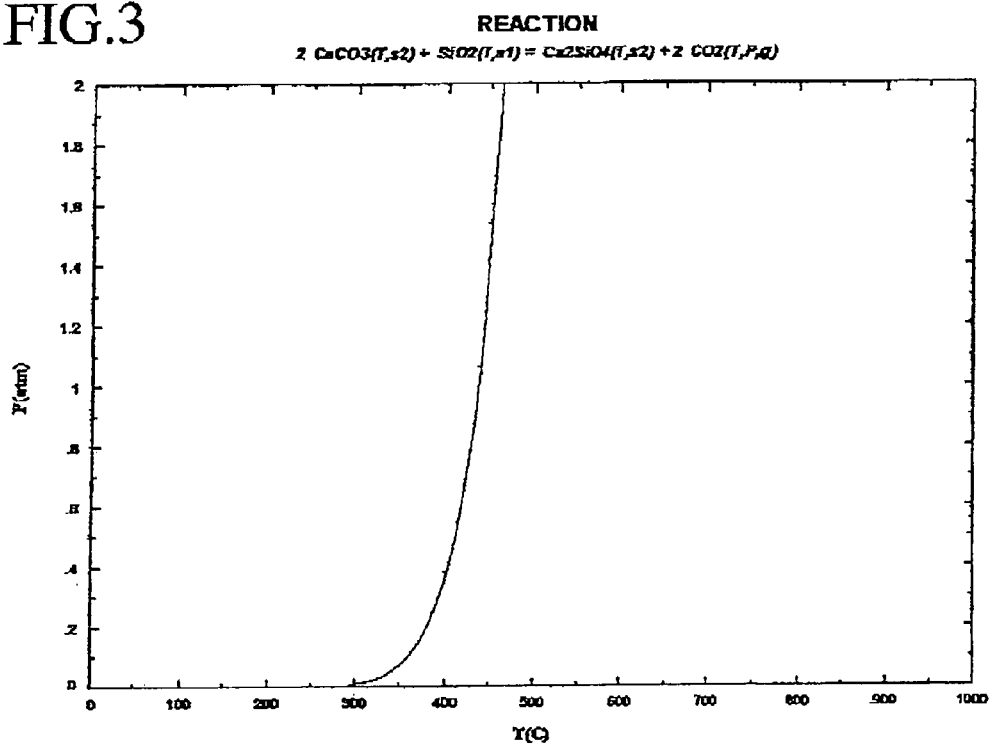
FIG. 3 is a graph showing a relationship between the concentration of $CO_2$ in the atmosphere and the reaction temperature represented by formula (1).
Figure 4:
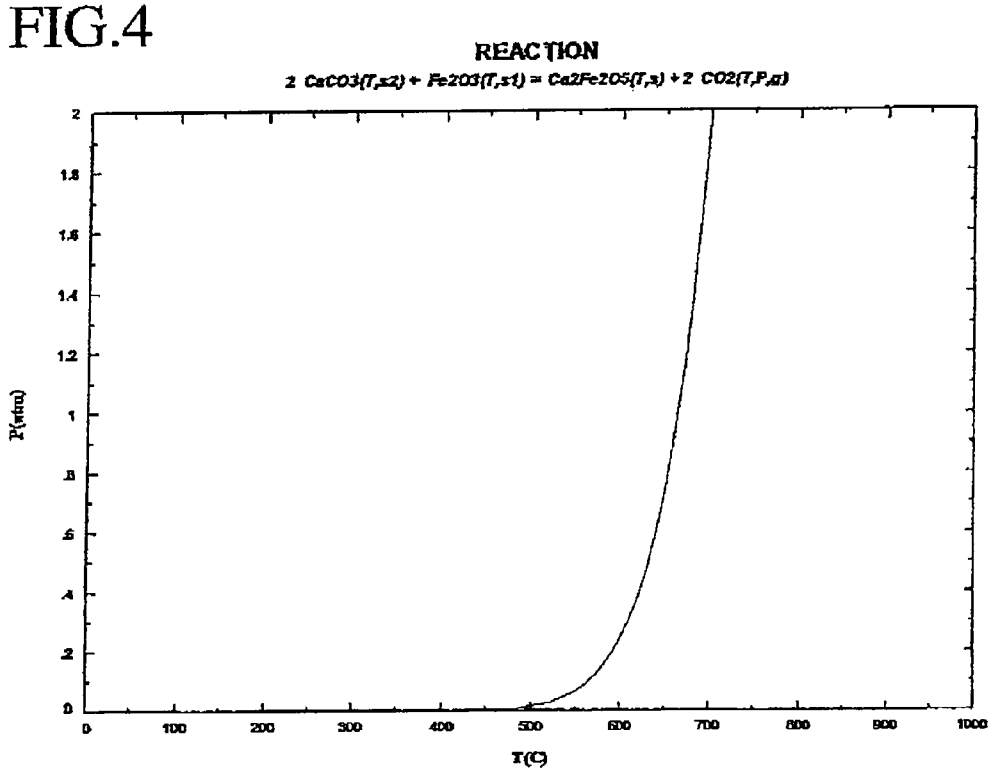
FIG. 4 is a graph showing a relationship between the concentration of $CO_2$ in the atmosphere and the reaction temperature represented by formula (2).
Figure 5:
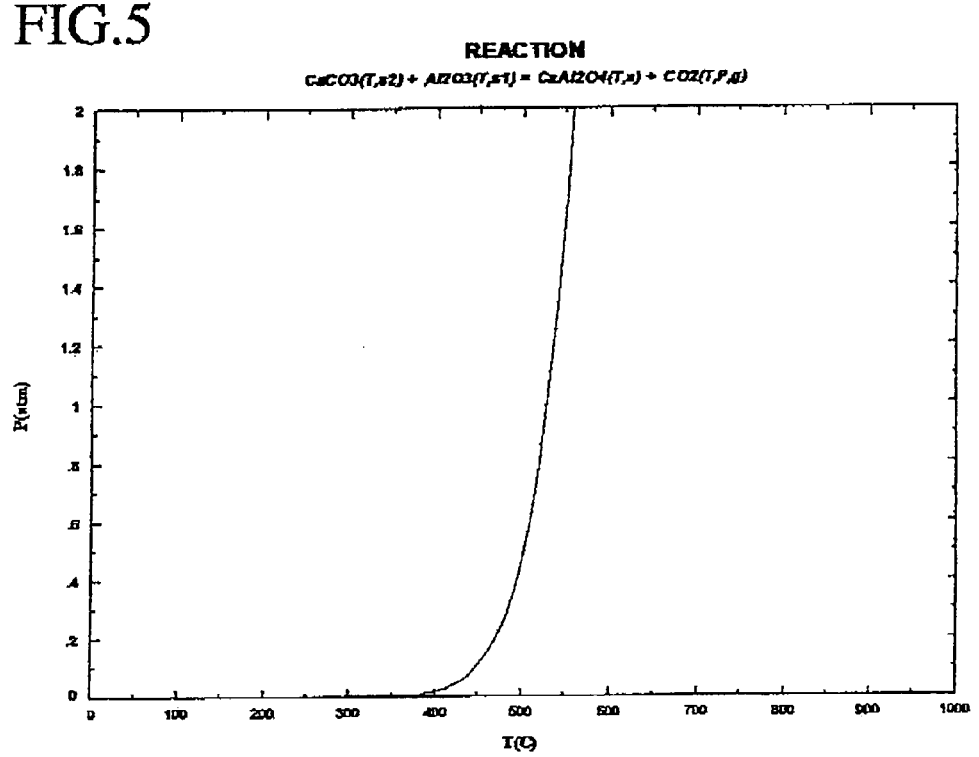
FIG. 5 is a graph showing a relationship between the concentration of $CO_2$ in the atmosphere and the reaction temperature represented by formula (3).
Figure 6:
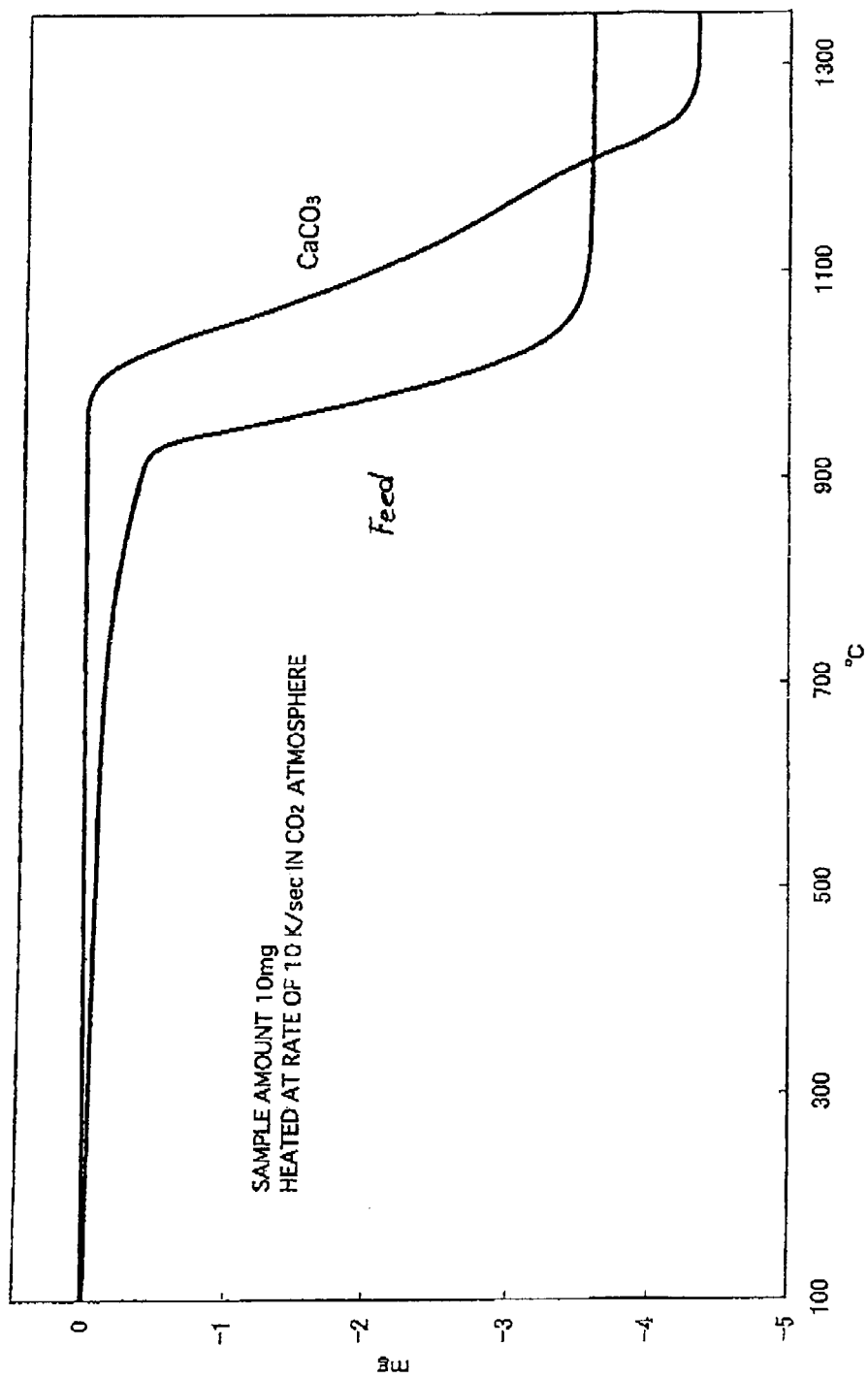
FIG. 6 is a graph showing a difference in the burning starting temperature and the burning ending temperature between the cement material and limestone alone under the $CO_2$ atmosphere.

FIG. 2 shows a second embodiment of $CO_2$ gas recovery facility according to the present invention. The same components as those shown in FIG. 1 are denoted by the same reference numerals and characters, and the explanation thereof is simplified.

The recovery facility is configured in such a manner that the existing cement manufacturing facility shown in FIG. 12 is used as it is, and that the recovery facility is added to the cement manufacturing facility.

That is, in this recovery facility, the extraction line 13 for sending the cement material from the preheater 3 of the cement manufacturing facility to the mixer/calciner 12 is branch-connected to a transfer pipe 3c for sending the cement material to the calciner 7 from the second stage cyclone from the bottom of the preheater 3. Thereby, the cement material before calcination preheated in the preheater 3 is introduced to the mixer/calciner 12.

Next, there will be described an embodiment of a $CO_2$ gas recovery method according to the present invention, which uses the $CO_2$ gas recovery facility shown in the first and second embodiments.

First, the cement material is fed from the feed pipes 4 and 11 to the uppermost cyclones of the preheater 3 and the second preheater 10, respectively.

Then, in the preheater 3, similarly to the prior art, in the process in which the cement material is successively sent to the lower stage cyclones, the cement material is preheated by the exhaust gas fed from the rotary kiln 1 via the exhaust gas pipe 3b. The cement material preheated to a temperature (for example, about 750° C.) below the calcination temperature is fed to the mixer/calciner 12 from the extraction line 13.

On the other hand, the cement material fed to the second preheater 10 is preheated eventually to a temperature (for example, about 750° C.) below the calcination temperature by the high-concentration and high-temperature $CO_2$ gas discharged from the mixer/calciner 12, as will be described below, and is fed to the mixer/calciner 12.

Further, the cement material fed to the mixer/calciner 12 is sent to the superheating furnace 15 from the superheating line 14, and is superheated to a temperature (for example, about 1100° C.) of at least the calcination temperature by the burner 17 in the superheating furnace 15. Thereafter, the superheated cement material is discharged from the exhaust pipe 18, so as to be subjected to the solid-gas separation in the cyclone 19, and is returned to the mixer/calciner 12 from the return pipe 20.

As a result, the superheated cement material and the cement material before calcination fed from the transfer pipe 10a and the extraction line 13 are mixed in the mixer/calciner 12. The atmosphere in the mixer/calciner 12 is maintained at a temperature (for example, 900° C.) of at least the calcination temperature, and thereby, the cement material before calcination is calcined. Then, most of the cement material calcined in the mixer/calciner 12 is again circularly fed to the superheating furnace 15. On the other hand, a part of the cement material calcined in the mixer/calciner 12 is returned to the kiln inlet part 2 of the rotary kiln 1 from the return line 16, and is eventually burned in the rotary kiln 1.

On the other hand, the exhaust gas containing $CO_2$ gas generated in the superheating furnace 15 is sent from the exhaust gas pipe 21 to the exhaust gas pipe 3b of the rotary kiln 1, so as to be used as a heat medium of the preheater 3 together with the exhaust gas from the rotary kiln 1.

On the other hand, the inside of the mixer/calciner 12 is filled with the $CO_2$ generated by the calcination of the cement material. Thus, the high-temperature $CO_2$ gas having a concentration of about 100% is introduced as a heating medium into the second preheater 10. As a result, $CO_2$ gas having the concentration of about 100% and resulting from the raw material can be recovered from the $CO_2$ gas exhaust line 24.

According to the method and facility for recovering $CO_2$ gas in the cement manufacturing facility as described above, the heat amount of the burner 17 in the superheating furnace 15 corresponds to the amount of heat consumed in the conventional calciner. Thus, the $CO_2$ gas resulting from the raw material and occupying at least a half of the total amount of $CO_2$ gas generated in the cement manufacturing facility can be recovered at a high concentration close to 100% by effectively using the heat source of the cement manufacturing facility without the need of new additional energy.

Example

Figure 7:
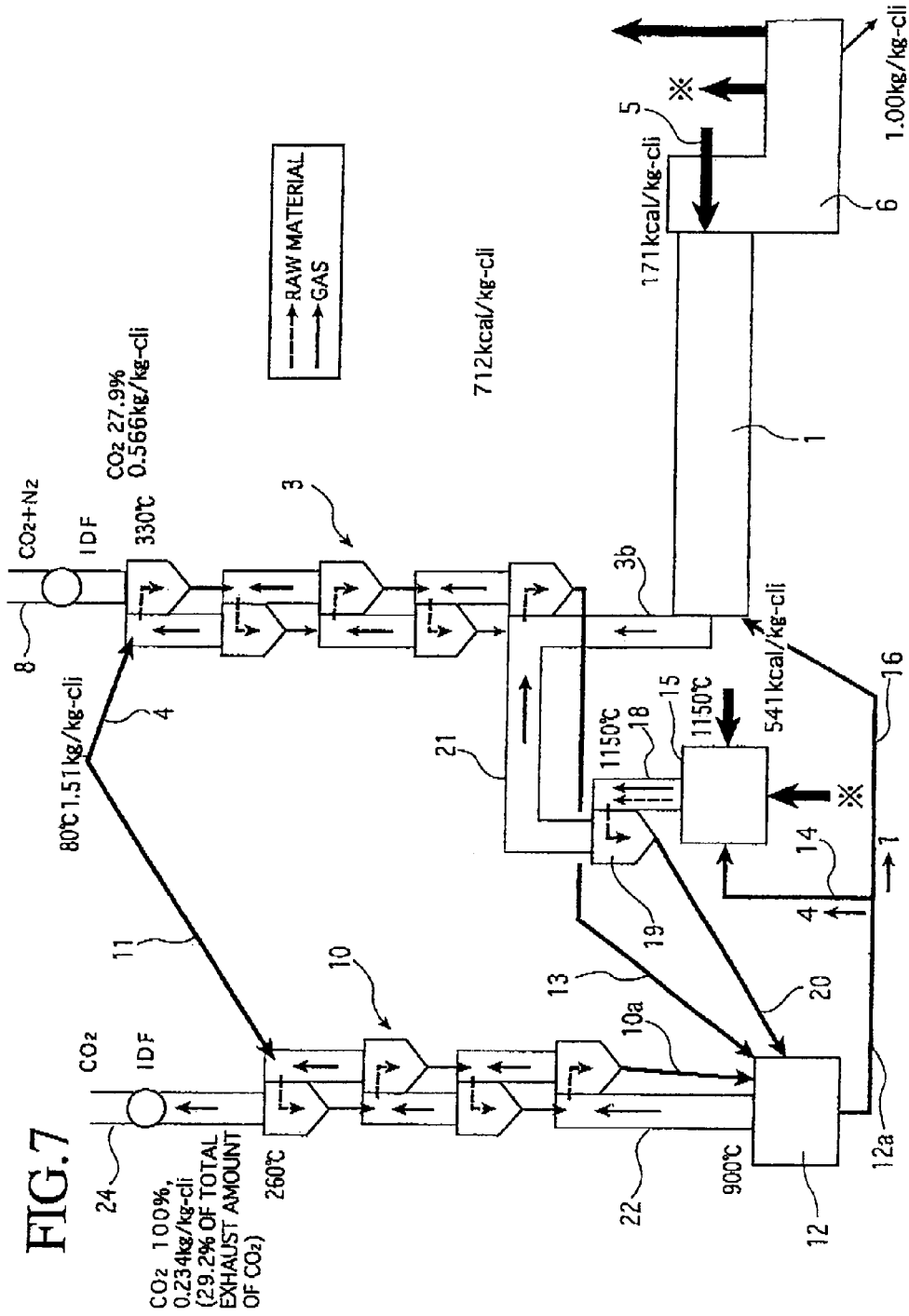
FIG. 7 shows results of process simulation performed for the $CO_2$ recovery facility shown in FIG. 1.

A process simulation was performed about the $CO_2$ gas recovery facility in the cement manufacturing facility shown in FIG. 1. FIG. 7 shows the results of the process simulation.

Here, the process simulation means a method in which mainly in a chemical engineering plant, the entire plant is represented by mathematical models representing a plurality of unit operations in the plant, and in which the mass flow rate, temperature, pressure, and the like, in respective places of the plant are calculated by repeating calculation based on the mathematical models.

In the present example, in addition to the equilibrium calculation model, models such as a flow path division model for dividing a flow path at a predetermined ratio, a heater model for converting a heat flow to a temperature difference between the input and output of a flow path, and a separator model for allocating respective chemical species to a plurality of divided flow paths at set ratios, were used to model the rotary kiln 1, the preheater 3, the clinker cooler 6, the mixer/calciner 12, the superheating furnace 15, and the like.

In the modeling, it was assumed that the raw material temperature is equal to the exhaust gas temperature in the heat exchange in each of the cyclones of the first preheaters 3 and the second preheater 10. In addition, the dust collection efficiency was taken into consideration. Further, it was assumed that the amount of thermal decomposition of limestone in the lowermost cyclone and the mixer/calciner 12 is determined based on the equilibrium calculation. Further, the fuel amount of the superheating furnace 15 and the fuel amount of the main burner 5 of the rotary kiln 1 were adjusted so as to allow the outlet temperature of the superheating furnace 15 and the clinker temperature at the outlet of the rotary kiln 1 to become predetermined temperatures, respectively. Also, the amounts of air required by the superheating furnace 15 and the main burner 5 were determined so as to allow the oxygen concentrations at the outlets of the superheating furnace 15 and the rotary kiln 1 to become predetermined values, respectively. Further, the heat recovery rate of the clinker cooler 6 was set to be constant.

Under the above described analysis conditions, when the cement material calcined in the mixer/calciner 12 was allocated to the rotary kiln 1 and the superheating furnace 15 at a ratio of 1:4, the heat consumption rate of fuel fed to the superheating furnace 15 and the main burner 5 was 712 kcal per 1 kg of clinker. This rate was equal to the value in the common cement manufacturing process.

Further, $CO_2$ gas is recovered at the concentration of 100% from the second preheater 10, and the amount of the $CO_2$ gas is 0.234 kg per 1 kg of calcined clinker. This amount corresponds to 29.2% of the total discharge amount of $CO_2$ gas including the $CO_2$ gas discharged from the preheater 3.

Therefore, it was confirmed that, according to the present invention, the recovered $CO_2$ gas having the concentration of 100% can be effectively used as the heat source in the second preheater 10 so as to then be recovered, and hence the total discharge amount of $CO_2$ gas discharged from the cement manufacturing facility can be reduced by 29.2%. Further, it was confirmed that the amount of the $CO_2$ gas resulting from the fuel, which is discharged from the preheater 3 and the like, and which is difficult to be effectively used because of its low concentration, is 0.566 kg (concentration of 27.9%) per 1 kg of clinker. This amount is smaller than the amount of the $CO_2$ gas discharged in the common cement manufacturing process. Thus, it was confirmed that the substantial discharge amount of $CO_2$ gas is also reduced.

Third Embodiment

Figure 8:
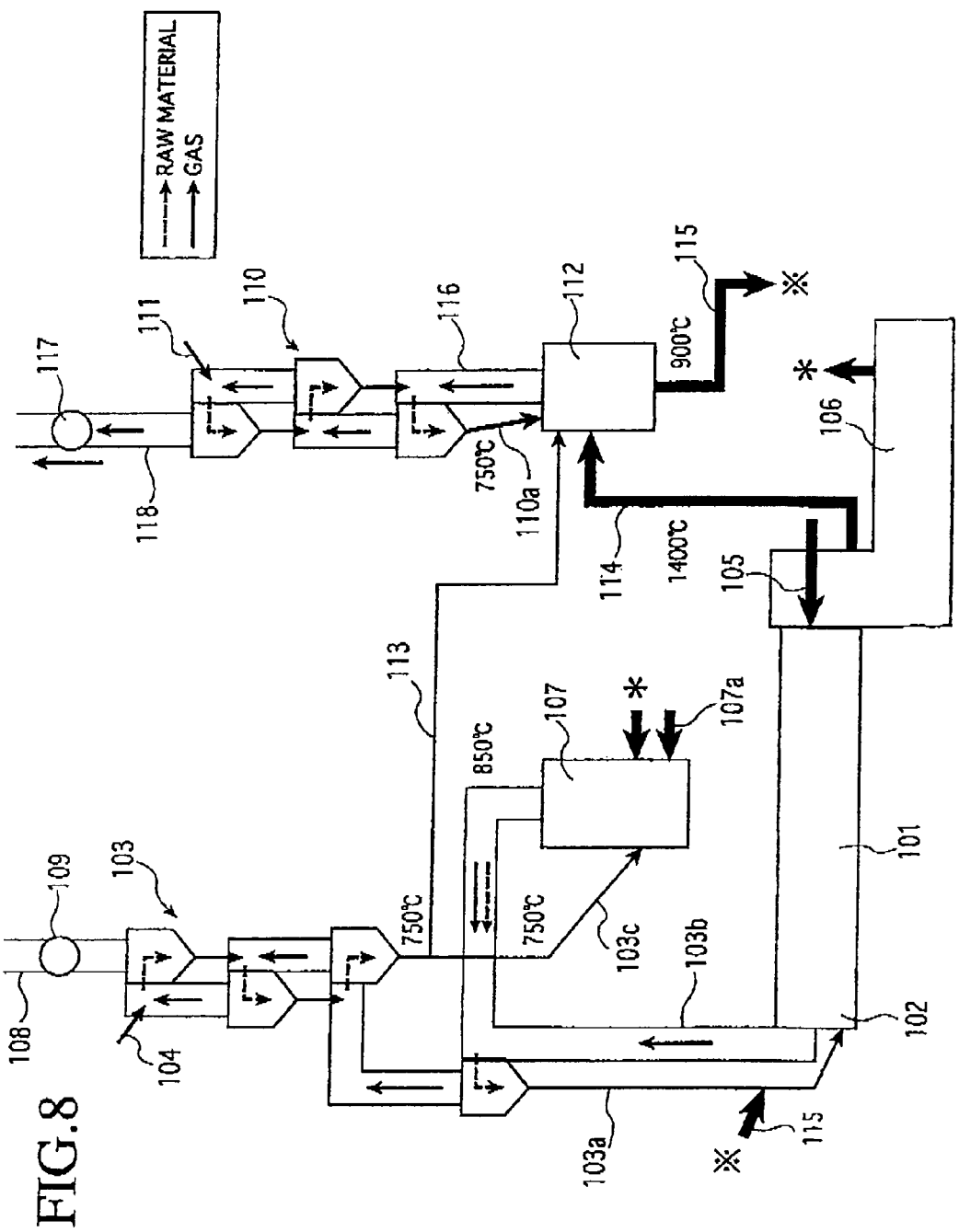
FIG. 8 shows a schematic configuration of a third embodiment of a $CO_2$ gas recovery facility according to the present invention.

FIG. 8 shows a schematic configuration of a third embodiment of a $CO_2$ gas recovery facility in a cement manufacturing facility according to the present invention.

In FIG. 8, reference numeral 110 denotes a second preheater provided independently of a preheater (first preheater) 103 of a cement manufacturing facility.

The second preheater 110 is configured by a plurality of stages of cyclones arranged in series in the vertical direction similarly to the preheater 103, and is configured such that the cement material is fed to the uppermost cyclone from a feed line 111. Further, the upper end of a transfer pipe 110a is connected to the bottom part of the lowermost cyclone of the second preheater 110, and the lower end of the transfer pipe 110a is introduced into a mixer/calciner 112.

On the other hand, in the preheater 103 of the cement manufacturing facility, an extraction line 113 for extracting the cement material before calcination is connected to a transfer pipe 103c for sending the cement material to a calciner 107 from the second stage cyclone from the bottom of the preheater 103. The distal end of the extraction line 113 is introduced into the mixer/calciner 112. Thereby, the cement material before calcination from the second preheater 110 and the cement material before calcination from the preheater 103 are introduced into the mixer/calciner 112. Further, the mixer/calciner 112 is connected with a cement clinker feed line 114 for extracting and feeding a part of cement clinker of high temperature (about 1400° C.), which is discharged from a rotary kiln 101 to be sent to a cement clinker cooler 106.

The mixer/calciner 112 is a powder-mixing furnace based on, for example, a fluidized bed system, a rotary kiln system, a packed bed system, or the like, for mixing the cement material before calcination with the high-temperature clinker. The inside of the mixer/calciner 112 is maintained in an atmosphere at least the calcination temperature of the cement material by the high-temperature cement clinker sent from the cement clinker feed line 114.

On the other hand, the bottom part of the mixer/calciner 112 is connected with a circulation line 115 for extracting the mixed powder of the cement material calcined in the mixer/calciner and the cement clinker and returning the extracted mixed powder to a transfer pipe 103a provided between the lowermost cyclone of the preheater 103 and the rotary kiln 101.

Further, a $CO_2$ exhaust gas line 116 for discharging $CO_2$ gas generated in the mixer/calciner 112 is connected to an upper part of the mixer/calciner 112. The $CO_2$ exhaust gas line 116 is also introduced into the second preheater 110 as a heating medium of the second preheater 110. Note that in the figure, reference numeral 117 denotes an exhaust fan of $CO_2$ gas, and reference numeral 118 denotes a $CO_2$ gas exhaust line.

When the fluidized bed type furnace is used as the mixer/calciner 112, the $CO_2$ gas discharged from the mixer/calciner 112 can also be extracted from the $CO_2$ exhaust gas line 116 or the exhaust line 118 so as to be circularly fed again and used in the mixer/calciner 112.

Next, there will be described an embodiment of a $CO_2$ gas recovery method according to the present invention, which uses the $CO_2$ gas recovery facility configured as described above.

First, the cement material is fed to the uppermost cyclones of the preheater 103 and the second preheater 110 from feed pipes 104 and 111, respectively.

Then, in the preheater 103, in the process in which the cement material is successively sent to the lower stage cyclones, the cement material is preheated by the exhaust gas fed from the rotary kiln 101 via an exhaust gas pipe 103b similarly to the prior art. The cement material to be sent to the calciner 107 from the second stage cyclone from the bottom part of the preheater 103, that is, the cement material preheated to a temperature (for example, about 750° C.) below the calcination temperature of the cement material is fed from the extraction line 113 to the mixer/calciner 112.

On the other hand, the cement material fed to the second preheater 110 is preheated eventually to a temperature (for example, about 750° C.) below the calcination temperature by the high-concentration and high-temperature $CO_2$ gas discharged from the mixer/calciner 112 via the $CO_2$ exhaust gas line 116 as will be described below, and is fed to the mixer/calciner 112.

Further, a part of high-temperature cement clinker (about 1400° C.) is sent to the mixer/calciner 112 from the cement clinker feed line 114. Thereby, the cement material and the cement clinker are mixed in the mixer/calciner 112. As a result, the inside of the mixer/calciner 112 is maintained at a temperature (for example, 900° C.) of at least the calcination temperature so as to allow the cement material before calcination to be calcined.

Further, the cement material calcined in the mixer/calciner 112 and the cement clinker are fed to a kiln inlet part 102 of the rotary kiln 101 from the transfer pipe 103a of the preheater 103 via the circulation line 115.

On the other hand, the inside of the mixer/calciner 112 is filled with $CO_2$ generated by the calcination of the cement material. Thus, the high-temperature $CO_2$ gas having a concentration of about 100% is introduced as a heating medium into the second preheater 110 from the $CO_2$ exhaust gas line 116. As a result, $CO_2$ gas resulting from the raw material and having the concentration of about 100% can be recovered from the $CO_2$ gas exhaust line 118.

In this way, in the method and facility for recovering $CO_2$ gas in the cement manufacturing facility as described above, the heat source in the cement manufacturing facility can be effectively used to eliminate the need of additional energy. Thereby, $CO_2$ gas resulting from the raw material and occupying at least a half of $CO_2$ gas generated in the cement manufacturing facility can be recovered at a high concentration close to 100%.

Example

Figure 9:
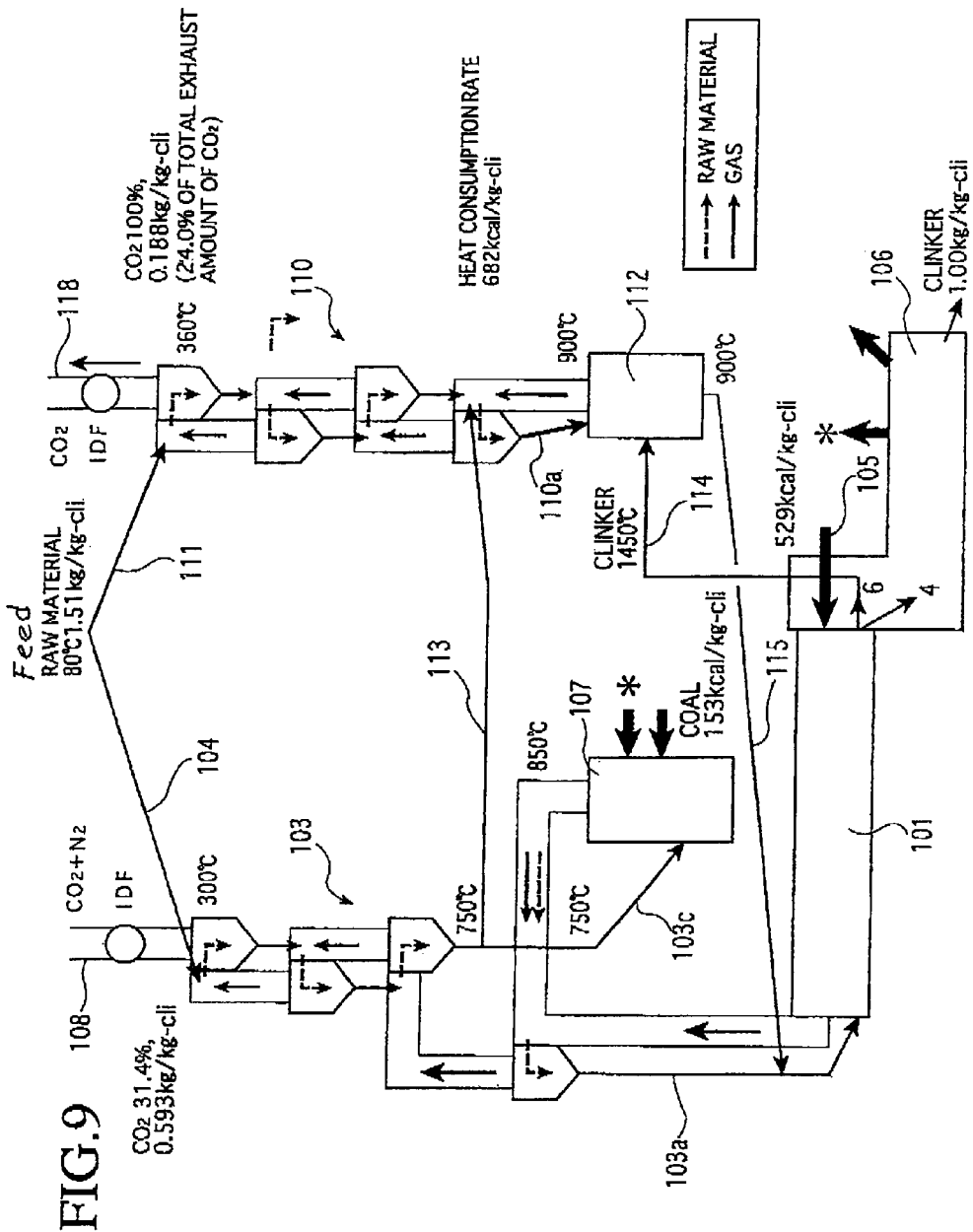
FIG. 9 shows results of process simulation performed for the $CO_2$ recovery facility shown in FIG. 8.

A process simulation was performed about the $CO_2$ gas recovery facility in the cement manufacturing facility shown in FIG. 8. FIG. 9 shows the results of the process simulation.

Here, the process simulation means a method in which mainly in a chemical engineering plant, the entire plant is represented by mathematical models representing a plurality of unit operations in the plant, and in which the mass flow rate, temperature, pressure, and the like, in respective places of the plant are calculated by repeating calculation based on the mathematical models.

In the present example, in addition to the equilibrium calculation model, models such as a flow path division model for dividing a flow path at a predetermined ratio, a heater model for converting a heat flow to a temperature difference between input and output of a flow path, and a separator model for allocating respective chemical species to a plurality of divided flow paths at set ratios, were used to model the rotary kiln 101, the preheater 103, the clinker cooler 106, the calciner 107, the mixer/calciner 112, and the like.

In the modeling, it was assumed that the raw material temperature is equal to the exhaust gas temperature in the heat exchange in each of the cyclones of the first preheater 103 and the second preheater 110. In addition, the dust collection efficiency was taken into consideration. Further, it was assumed that the amount of thermal decomposition of limestone in the lowermost cyclone, the calciner 107, and the mixer/calciner 112 is determined based on the equilibrium calculation. Further, the fuel amount of the calciner 107 and the fuel amount of the main burner 105 of the rotary kiln 101 were adjusted so as to allow the outlet temperature of the calciner 107 and the clinker temperature at the outlet of the rotary kiln 101 to become predetermined temperatures, respectively. Also, the required air amounts of the calciner 107 and the main burner 105 were determined so as to allow the oxygen concentrations at the outlets of the calciner 107 and the rotary kiln 101 to become predetermined values, respectively. Further, the heat recovery rate of the clinker cooler 106 was set to be constant.

Under these analysis conditions, when cement is manufactured by allocating 40% of the cement clinker obtained by burning the cement material in the rotary kiln 101 to the clinker cooler 106 and allocating 60% of the cement clinker to the mixer/calciner 112, the heat consumption rate of fuel fed to the calciner 107 and the main burner 105 was 682 kcal per 1 kg of clinker, which was equal to the value obtained in the common cement manufacturing process.

Further, $CO_2$ gas is recovered at the concentration of 100% from the second preheater 110. The amount of the recovered $CO_2$ gas is 0.188 kg per 1 kg of cement clinker obtained by burning the cement material, and corresponds to 24.0% of the total discharge amount of $CO_2$ gas including the $CO_2$ gas discharged from the preheater 103.

Therefore, it was confirmed that, according to the present invention, the recovered $CO_2$ gas having the concentration of 100% can be effectively used in the second preheater 110 and then recovered, and that the total discharge amount of $CO_2$ gas discharged from the cement manufacturing facility can be reduced by 24.0%. Further, it was confirmed that the amount of the $CO_2$ gas resulting from the fuel, which is discharged from the preheater 103, and the like, and which is difficult to be effectively used because of its low concentration, is 0.593 kg (concentration of 31.4%) per 1kg of clinker. This amount is smaller than the amount discharged from the common cement manufacturing facility. Thus, it was confirmed that the substantial discharge amount of $CO_2$ gas is also reduced.

Fourth Embodiment

Figure 10:
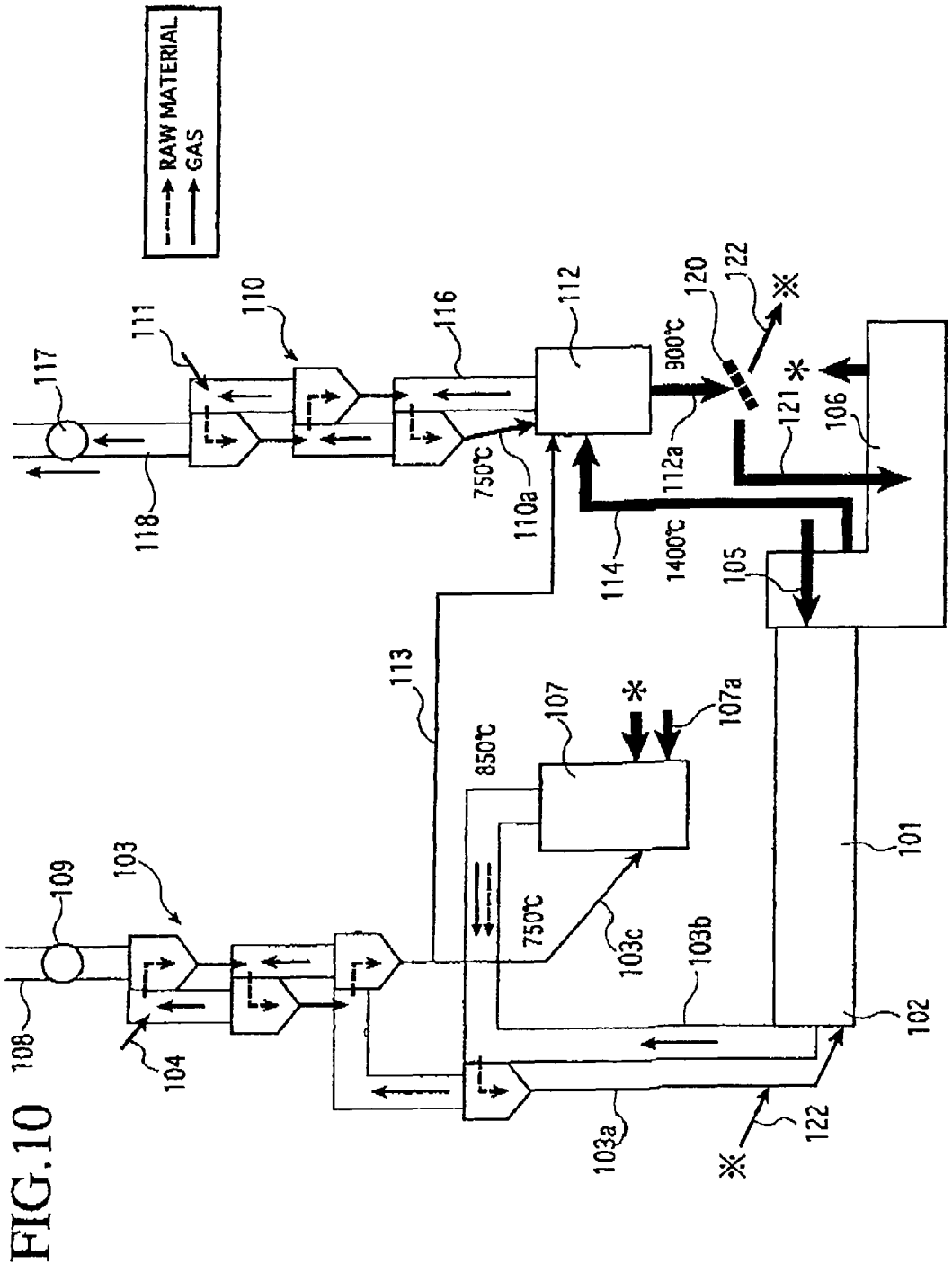
FIG. 10 shows a schematic configuration of a fourth embodiment of a $CO_2$ gas recovery facility according to the present invention.

FIG. 10 shows a fourth embodiment of $CO_2$ gas recovery facility in a cement manufacturing facility according to the present invention. In the figure, the same components as those shown in FIG. 8 are denoted by the same reference numerals and characters, and the explanation thereof is simplified.

The recovery facility of the present embodiment is different from the recovery facility shown in FIG. 8 in that a classifier (separation means) 120, such as a screen, for separating the discharged cement material from the discharged cement clinker by the difference in the particle size therebetween is provided below a discharge pipe 112a connected to the bottom part of the mixer/calciner 112.

Thus, the cement clinker separated by the classifier 120 is fed into the cement clinker cooler 106 from a return line 121. Further, the calcined cement material is returned via a return line 122 to the transfer pipe 103a provided between the lowermost cyclone of the preheater 103 and the kiln inlet part 102 of the rotary kiln 101.

In the recovery facility configured as described above, the mixed powder of the cement material calcined in the mixer/calciner 112 and extracted from the discharge pipe 112a, and the cement clinker extracted from the discharge pipe 112a is roughly separated from each other by the classifier 120. Then, the cement clinker is fed into the cement clinker cooler 106 from the return line 121. The calcined cement material is returned to the transfer pipe 103a provided between the lowermost cyclone of the preheater 103 and the kiln inlet part 102 of the rotary kiln 101 by the return line 122, so as to be eventually burned in the rotary kiln 101.

This results in an advantage that, when an amount of heat sufficient to calcine the cement material in the mixer/calciner 112 can be obtained only from a part of the cement clinker extracted from the cement kiln 101, the cement clinker is not sent again to the burning process, and extra power for driving the rotary kiln 101, and the like, is not consumed.

Fifth Embodiment

Figure 11:
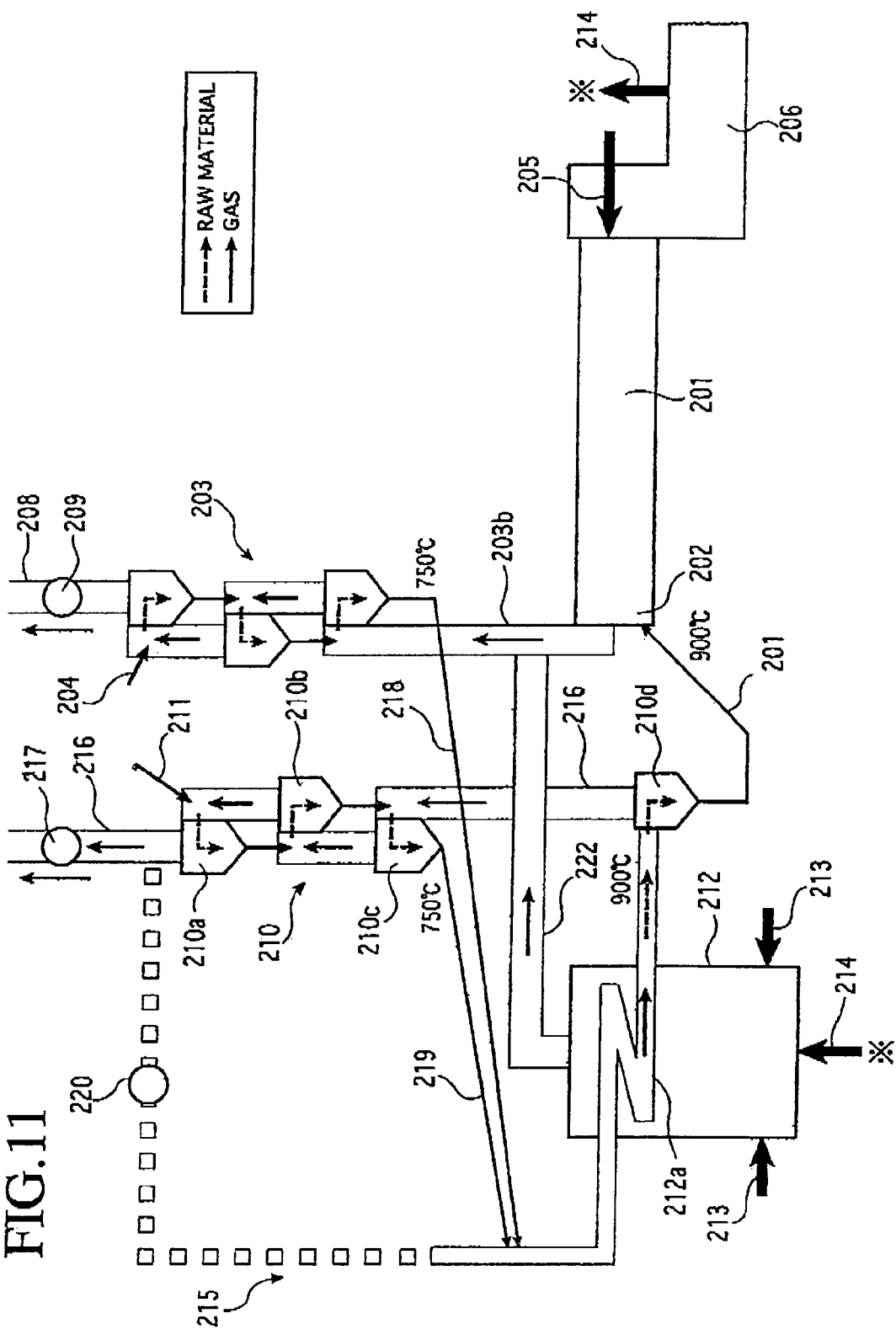
FIG. 11 shows a schematic configuration of a fifth embodiment of a $CO_2$ gas recovery facility according to the present invention.

FIG. 11 shows a schematic configuration of a fifth embodiment of a $CO_2$ gas recovery facility in a cement manufacturing facility according to the present invention.

In FIG. 11, reference numeral 210 denotes a second preheater provided independently of a preheater (first preheater) 203 of the cement manufacturing facility.

The second preheater 210 is configured by a plurality of stages (four stages in the figure) of cyclones 210a to 210d arranged in series in the vertical direction similarly to the preheater 203. The cement material is fed to the uppermost cyclone 210a from a feed line 211.

Further, an externally heated calciner 212 is provided adjacent to the second preheater 210.

A burner 213 for burning fossil fuel, such as coal, is provided in the externally heated calciner 212. Further, the air extracted from a clinker cooler 206 is introduced, as combustion air, into the externally heated calciner 212 from an air feed pipe 214, so as to heat the inside of the externally heated calciner 212 to about 1100° C. A heat exchange tube 212a is provided in the externally heated calciner 212. Further, a circulation line 215 is provided between the externally heated calciner 212 and the second preheater 210.

The circulation line 215 is provided between the discharge side of the heat exchange tube 212a and a fluid inlet port of the lowermost cyclone 210d (solid-gas separation means) of the second preheater 210. Further, the circulation line 215 is branched from an exhaust line (recovery line) 216 of the uppermost cyclone 210a of the second preheater 210, so as to be connected to the inlet side of the heat exchange tube 212a of the externally heated calciner 212. Here, the circulation line 215 can also be provided between the discharge side of the heat exchange tube 212a, and the fluid inlet port of the other cyclone 210c, 210b or 210a of the second preheater 210. Note that reference numeral 217 in the figure denotes a $CO_2$ gas exhaust fan provided in the exhaust line 216.

Further, in the preheater 203 of the cement manufacturing facility, a first extraction line 218 is provided to extract the cement material before calcination from the lowermost cyclone. The distal end of the first extraction line 218 is connected to the circulation line 215 on the inlet side of the externally heated calciner 212. Further, in the second preheater 210, a second extraction line 219 is provided to extract the other cement material before calcination from the second stage cyclone 210c from the bottom part of the second preheater 210. The distal end of the second extraction line 219 is also similarly connected to the circulation line 215 on the inlet side of the externally heated calciner 212.

Further, a $CO_2$ circulation fan 220 is provided in the circulation line 215 on the upstream side of the connection part of the first and second extraction lines 218 and 219.

On the other hand, at the bottom part of the lowermost cyclone 210d of the second preheater 210, a transfer pipe (return line) 221 is provided to transfer, to a kiln inlet part 202 of a rotary kiln 201, the calcined cement material which is subjected to solid-gas separation in the cyclone 210d and discharged from the cyclone 210d.

Further, at the upper part of the externally heated calciner 212, an exhaust gas pipe 222 is provided to exhaust the exhaust gas generated by the combustion in the burner 213. The exhaust gas pipe 222 is connected to an exhaust gas pipe 203b extended from the rotary kiln 201. This allows the discharged high-temperature exhaust gas to be used as a part of the heat source of the preheater 203.

Note that the inside of the externally heated calciner 212 needs to be maintained at a high temperature of about 1100° C. However, the temperature of the exhaust gas from the rotary kiln 201 is 1100 to 1200° C. Thus, when all or a fixed amount of the exhaust gas from the rotary kiln 201 is not made to flow into the exhaust gas pipe 203b but is directly introduced into the externally heated calciner 212 so as to be again sent to the preheater 203 via the exhaust gas pipe 222, the exhaust gas from the rotary kiln 201 can be effectively used.

Next, there will be described an embodiment of a $CO_2$ gas recovery method according to the present invention, which uses the $CO_2$ gas recovery facility configured as described above.

First, the cement material is fed to the uppermost cyclone of the preheater 203 and the uppermost cyclone 210a of the second preheater 210 from the feed pipes 204 and 211, respectively.

Then, in the preheater 203, in the process in which the cement material is successively sent to the lower cyclones, the cement material is preheated by the exhaust gas fed from the rotary kiln 201 via the exhaust gas pipe 203b similarly to the prior art. Thus, the cement material preheated to a temperature (for example, about 750° C.) below the calcination temperature in the lowermost cyclone is fed to the circulation line 215 from the first extraction line 218.

On the other hand, the cement material fed to the second preheater 210 is preheated by the high-concentration and high-temperature $CO_2$ gas discharged from the circulation line 215, as will be described below. Further, in the second stage cyclone 210c from the bottom part of the second preheater 210, the cement material is preheated to a temperature (for example, about 750° C.) below the calcination temperature, so as to be similarly fed to the circulation line 215 from the second extraction line 219.

Then, the cement material before calcination fed to the circulation line 215 from the first and second extraction lines 218 and 219 is sent to the heat exchange tube 212a in the externally heated calciner 212. In the externally heated calciner 212, the cement material before calcination is heated to a temperature of about 900° C. by the combustion of the burner 213. As a result, the cement material before calcination is calcined, and $CO_2$ gas is generated by the calcination of the cement material. Thus, the inside of the heat exchange tube 212a is filled with the calcined cement material and the high-concentration $CO_2$ gas.

Then, the calcined cement material and the high-concentration $CO_2$ gas discharged from the heat exchange tube 212a in the externally heated calciner 212 through the circulation line 215 are sent to the lowermost cyclone 210d of the second preheater 210, so as to be subjected to solid-gas separation. Then, the calcined cement material separated in the lowermost cyclone 210d is fed to the kiln inlet part 202 of the rotary kiln 201 from the transfer pipe 221, so as to be finally burned in the rotary kiln 201.

On the other hand, the high-concentration $CO_2$ gas separated in the cyclone 210d ascends through the exhaust line 216 in the second preheater 210, so as to be used as a heat medium in the second preheater 210. Thereafter, a part of the high-concentration $CO_2$ gas is again circulated from the circulation line 215 to the heat exchange tube 212a in the externally heated calciner 212 by the suction of the $CO_2$ circulation fan 220. Thereby, the calcined cement material in the circulation line 215 can be easily carried. Also, the cement material can also be dispersed so as to be more easily calcined. Further, the $CO_2$ gas having a concentration of about 100% is recovered from the exhaust line 216 by the $CO_2$ gas exhaust fan 217.

In this way, according to the method and facility for recovering $CO_2$ gas in the cement manufacturing facility as described above, $CO_2$ gas resulting from the raw material and occupying at least a half of the $CO_2$ gas generated in the cement manufacturing facility can be recovered at a high concentration close to 100% by effectively using the heat source in the cement manufacturing facility without the need of new additional energy.

REFERENCE SIGNS LIST

1 Rotary kiln (cement kiln)
3 Preheater (first preheater)
10 Second preheater
10a Transfer pipe
12 Mixer/calciner
13 Extraction line
14 Superheating line
15 Superheating furnace
16 Return line
18 Exhaust pipe 19 Cyclone
20 Return pipe
22 $CO_2$ gas exhaust pipe
101 Rotary kiln (cement kiln)
103 Preheater (first preheater)
110 Second preheater
110a Transfer pipe
112 Mixer/calciner
112a Discharge pipe
113 Extraction line
114 Cement clinker feed line
115 Circulation line
116 $CO_2$ exhaust gas line
120 Classifier (separation means)
121 Cement clinker return line
122 Cement material return line
201 Rotary kiln (cement kiln)
203 Preheater (first preheater)
210 Second preheater
210d Lowermost cyclone (solid-gas separation means)
212 Externally heated calciner
212a Heat exchange tube
215 Circulation line
216 $CO_2$ exhaust line (recovery line)
218 First extraction line
219 Second extraction line
221 Transfer pipe (return line)

The invention claimed is:

1. A method for recovering $CO_2$ gas generated in a cement manufacturing plant, the method comprising:
   maintaining an inside of a mixer/calciner at at least a calcination temperature of a pre-calcination cement material by superheating the pre-calcination cement material extracted from a first preheater to at least the calcination temperature in a superheating furnace, to give a superheated cement material; and then
   feeding the superheated cement material to the mixer/calciner and mixing the superheated cement material with a new pre-calcination cement material that is extracted from the first preheater and fed to the mixer/calciner; and
   calcining the pre-calcination cement material in the mixer/calciner, to give calcined cement material, and then again
   returning the calcined cement material to the superheating furnace so as to repeat circulation to the mixer/calciner, and to recover $CO_2$ gas generated in the mixer/calciner; and
   feeding a part of the calcined cement material to a cement kiln,
   wherein the method recovers recover $CO_2$ gas generated in the cement manufacturing plant, and,
   in the cement manufacturing plant, the pre-calcination cement material is preheated by the first preheater and is then fed and burned in the cement kiln having a high temperature atmosphere therein, wherein the pre-calcination cement material extracted from the first preheater and the new pre-calcination cement material preheated by a second preheater, provided independently of the first preheater, are fed to the mixer/calciner, and $CO_2$ gas generated in the mixer/calciner is recovered after being employed as a heat source of the second preheater.

2. A facility for recovering $CO_2$ gas generated in a cement manufacturing plant, the facility comprising:
   an extraction line, in which pre-calcination cement material is extracted from a first preheater;
   a mixer/calciner, into which the pre-calcination cement material extracted from the extraction line is introduced;
   a superheating furnace, in which partially-calcined cement material fed from the mixer/calciner is superheated to at least a calcination temperature of the pre-calcination cement material to give a calcined cement material;
   a circulation line, in which the cement material superheated in the superheating furnace is returned to the mixer/calciner, and in which the partially-calcined cement material in the mixer/calciner is sent to the superheating furnace;
   a return line, in which a part of the calcined cement material is returned to a first preheater or a cement kiln; and
   a $CO_2$ gas exhaust pipe, in which $CO_2$ gas generated in the mixer/calciner is recovered,
   wherein the cement manufacturing plant comprises the first preheater, in which the pre-calcination cement material is preheated, and the cement kiln, in which the pre-calcination cement material preheated by the first preheater is burned,
   wherein the facility is one in which $CO_2$ gas generated in the cement manufacturing plant is recovered; and
   a second preheater, provided independently of the first preheater, in which a second pre-calcination cement material is preheated; and
   a transfer pipe, in which the second pre-calcination cement material preheated by the second preheater is fed to the mixer/calciner,
   wherein the $CO_2$ gas exhaust pipe extended from the mixer/calciner is introduced into the second preheater as a heat source of the second preheater.

3. A method for recovering $CO_2$ gas generated in a cement manufacturing plant, the method comprising,
   after calcining a pre-calcination cement material in a mixer/calciner, the inside of which mixer/calciner is maintained at at least a calcination temperature of the pre-calcination cement material by feeding the pre-calcination cement material extracted from a first preheater to the mixer/calciner and by introducing a part of a high-temperature cement clinker discharged from a cement kiln into the mixer/calciner, to give a calcined cement material,
   returning at least the calcined cement material to the first preheater or the cement kiln;
   recovering $CO_2$ gas generated in the mixer/calciner,
   separating the calcined cement material, calcined in the mixer/calciner, and the cement clinker from each other, to give a separate cement material; and
   returning the separated cement material to the first preheater or the cement kiln,
   wherein the cement manufacturing plant is one in which the pre-calcination cement material is preheated by the first preheater, to give preheated cement material, and in which cement clinker is then manufactured by feeding and burning the preheated cement material in the cement kiln having a high-temperature atmosphere.

4. A method for recovering $CO_2$ gas generated in a cement manufacturing plant, the method comprising,
   after calcining a pre-calcination cement material in a mixer/calciner, the inside of which mixer/calciner is maintained at at least a calcination temperature of the pre-calcination cement material by feeding the pre-calcination cement material extracted from a first preheater to the mixer/calciner and by introducing a part of a high-temperature cement clinker discharged from a cement kiln into the mixer/calciner, to give a calcined cement material,
   returning at least the calcined cement material to the first preheater or the cement kiln;

recovering CO$_2$ gas generated in the mixer/calciner, feeding the pre-calcination cement material extracted from the first preheater and a second pre-calcination cement material preheated to a temperature below a calcination temperature of the second pre-calcination cement material in a second preheater, provided independently of the first preheater, to the mixer/calciner;

recovering CO$_2$ gas generated in the mixer/calciner after employing the CO$_2$ gas as a heat source of the second preheater;

separating the calcined cement material, calcined in the mixer/calciner, and the cement clinker are separated from each other, to give a separated cement material; and returning the separated cement material to the first preheater or the cement kiln, wherein the cement manufacturing plant is one in which the pre-calcination cement material is preheated by the first preheater, to give preheated cement material, and in which cement clinker is then manufactured by feeding and burning the preheated cement material in the cement kiln having a high-temperature atmosphere.

5. A facility for recovering CO$_2$ gas generated in a cement manufacturing plant, the facility comprising:

an extraction line, in which pre-calcination cement material from a first preheater is extracted;

a mixer/calciner, into which the pre-calcination cement material extracted from the extraction line and a portion of high-temperature cement clinker extracted from a cement kiln is introduced and calcined;

a separation unit, in which calcined cement material, calcined in the mixer/calciner, is separated from the cement clinker;

a return line, in which separated cement material, separated by the separation unit, is returned to a first preheater or the cement kiln; and a CO$_2$ exhaust gas line, in which CO$_2$ gas generated in the mixer/calciner is recovered, wherein the cement manufacturing plant comprises the first preheater for preheating the pre-calcination cement material, and the cement kiln for manufacturing cement clinker by burning the pre-calcination cement material preheated by the first preheater, and wherein the facility is one in which CO$_2$ gas generated in the cement manufacturing plant is recovered.

6. A facility for recovering CO$_2$ gas generated in a cement manufacturing plant, comprising:

an extraction line, in which pre-calcination cement material is extracted from a first preheater;

a mixer/calciner, into which the pre-calcination cement material extracted from the extraction line and a portion of high-temperature cement clinker extracted from a cement kiln, is introduced and calcined;

a return line in which calcined cement material calcined in the mixer/calciner and the cement clinker are returned to a first preheater or the cement kiln;

a CO$_2$ exhaust gas line with which CO$_2$ gas generated in the mixer/calciner is recovered, a second preheater, provided independently of the first preheater, in which a second pre-calcination cement material is preheated; and a transfer pipe, which feeds to the mixer/calciner, the second pre-calcination cement material preheated by the second preheater, wherein the CO$_2$ exhaust gas line extended from the mixer/calciner is introduced into the second preheater as a heat source of the second preheater, wherein the cement manufacturing plant comprises the first preheater for preheating the pre-calcination cement material, and the cement kiln in which cement clinker is manufactured by burning the cement pre-calcination material preheated by the first preheater, and wherein the facility is one in which CO$_2$ gas generated in the cement manufacturing plant is recovered.

7. A method for recovering CO$_2$ gas generated in a cement manufacturing plant, the method comprising:

after calcining a pre-calcination cement material extracted from a preheater by indirectly heating the pre-calcination cement material and a second pre-calcination cement material preheated to a temperature below a calcination temperature of the second pre-calcination cement material in a second preheater, provided independently of the preheater and comprising a plurality of stages of cyclones, to at least the calcination temperature of the second pre-calcination cement material in the externally heated calciner so as to be calcined to give a calcined cement material, separating the calcined cement material and the CO$_2$ gas generated in calcination at a time of calcination from each other by the cyclones, to give separated cement material;

returning the separated cement material to the preheater or a cement kiln; and recovering the CO$_2$ gas after employing the CO$_2$ gas as a heat source of the second preheater, wherein the cement manufacturing plant is one in which the pre-calcination cement material is preheated by the preheater and is then fed and burned in the cement kiln having a high temperature atmosphere, wherein the pre-calcination cement material comprises limestone, $SiO_2$, $Al_2O_3$ and $Fe_2O_3$.

8. A facility for recovering CO$_2$ gas generated in a cement manufacturing plant, the facility comprising:

a first extraction line, in which pre-calcination cement material is extracted from the preheater;

an externally heated calciner comprising the first extraction line introduced therein, in which the pre-calcination cement material is calcined by indirectly heating the pre-calcination cement material to at least a calcining temperature thereof, to give a calcined cement material;

a solid-gas separation unit provided on an outlet side of the externally heated calciner, in which the calcined cement material and CO$_2$ gas sent from the first extraction line are separated from each other;

a return line, in which cement material separated by the solid-gas separation unit is returned to the preheater or a cement kiln; and a CO$_2$ gas recovery line, in which the CO$_2$ gas separated by the solid-gas separation unit is recovered, wherein the cement manufacturing plant comprises the preheater in which the pre-calcination cement material is preheated, and the cement kiln in which the pre-calcination cement material preheated by the preheater is burned, wherein the facility is one in which CO$_2$ gas generated in the cement manufacturing plant is recovered;

a second preheater provided independently of the preheater and comprising a plurality of stages of cyclones, in which a second pre-calcination cement material is preheated;

a second extraction line, in which the second pre-calcination cement material preheated by the second preheater is extracted; and a circulation line connected between a discharge side of the externally heated calciner and a lower stage cyclone of the second preheater, and branched from an exhaust line of an upper stage cyclone so as to be connected to an inlet side of the externally heated calciner, wherein the solid-gas separation unit is the lower stage cyclone of the second preheater, and the first extraction line and the second extraction line are connected to the circulation line on an upstream side of the externally heated calciner.

9. The facility according to claim 5, further comprising:

a second preheater, provided independently of the first preheater, which preheats a second pre-calcination cement material; and a transfer pipe, which feeds to the mixer/calciner, the second pre-calcination cement material preheated by the second preheater, wherein the $CO_2$ exhaust gas line extended from the mixer/calciner is introduced into the second preheater as a heat source of the second preheater.

* * * * *